United States Patent [19]
Farnsworth et al.

[11] Patent Number: 5,625,348
[45] Date of Patent: Apr. 29, 1997

[54] METHOD AND APPARATUS FOR DETECTING LOCAL PRECURSOR SEISMIC ACTIVITY

[76] Inventors: David F. Farnsworth, 1934 SW. Stringtown Rd., Forest Grove, Oreg. 97116; Larry A. Park, 50631 NW. Gheen Rd., Manning, Oreg. 97125

[21] Appl. No.: 521,612

[22] Filed: Aug. 30, 1995

Related U.S. Application Data

[63] Continuation-in-part of Ser. No. 424,409, Mar. 10, 1994.
[51] Int. Cl.$^6$ .................................................. G08B 21/00
[52] U.S. Cl. ........................ 340/690; 340/601; 73/654; 73/649; 73/657; 73/594; 364/420; 364/421; 324/323; 324/324; 367/185
[58] Field of Search .................................. 340/690, 686, 340/540, 669, 601; 73/652, 654, 649, 657, 594; 364/420, 421; 324/323, 344; 200/61.45 R, 61.51; 33/366; 181/108, 122; 367/185, 906, 9

[56] References Cited

U.S. PATENT DOCUMENTS

| | | | |
|---|---|---|---|
| 1,575,824 | 3/1926 | Eiffert | 455/270 |
| 1,850,811 | 3/1932 | Selvig | 455/270 |
| 1,922,335 | 8/1933 | Sobocinski | 343/905 |
| 2,553,734 | 5/1951 | Adler | 455/205 |
| 3,067,404 | 12/1962 | Hildebrandt | 367/182 |
| 3,506,957 | 4/1970 | Davison | 367/36 |
| 3,866,111 | 2/1975 | Warren | 324/334 |
| 3,953,829 | 4/1976 | Boyle | 367/185 |
| 4,064,480 | 12/1977 | Howlett | 367/67 |
| 4,066,992 | 1/1978 | Buller et al. | 340/690 |
| 4,124,841 | 11/1978 | Kettunen | 340/690 |
| 4,132,947 | 1/1979 | Weischedel et al. | 324/76.18 |
| 4,219,804 | 8/1980 | Weischedel | 340/601 |

(List continued on next page.)

FOREIGN PATENT DOCUMENTS

| | | |
|---|---|---|
| 1536289 | 6/1967 | France. |
| 2019749 | 1/1969 | France. |
| 2122312 | 1/1971 | France. |

OTHER PUBLICATIONS

*Earthquakes*, Bruce A. Bolt, 1993, pp. 17–23, 45–47, 107, 127–130, 188–194, 202–206, 297–299, plus Glossary.
*Quantitative Seismology*, Theory and Methods, vol. 1, Aki and Richards, 1980, pp. 525–533.

(List continued on next page.)

*Primary Examiner*—Jeffery Hofsass
*Assistant Examiner*—Benjamin C. Lee

[57] ABSTRACT

A method and apparatus for sensing one or more physical parameters, including acoustic waves having frequencies from approximately 0 Hz to 15 Hz, electromagnetic waves having frequencies from approximately 0 Hz through 35 Hz and seismic waves having frequencies from approximately 0 Hz through 15 Hz, and detecting precursor seismic activity indicated therein. Acoustic waves are sensed using an infrasonic transducer that produces an electrical signal representative of such waves. Electromagnetic waves are sensed using a suitable antenna, the antenna preferably comprising AC power lines. The antenna produces an electrical signal representative of such waves. Seismic waves are sensed using an accelerometer that produces an electrical signal representative of such waves. In one embodiment of the invention, the electrical signals are routed to a signal conditioning mechanism that converts the signals into detect signals suitable for detection of precursor seismic activity, the detect signals being, in turn, routed to a processing unit for detection of precursor seismic activity. In another embodiment, the electrical signal representative of the electromagnetic radiation is passed in parallel through a filter function to isolate one or more detect signals having predetermined bandwidths, and through a comparison function to produce a rejection signal that indicates the presence of noise. The isolated detect signals and rejection signal are provided to a processing unit for detection of precursor seismic activity, if any. An I/O stage alerts the user of any potentially impending earthquake, the I/O stage's alarms being triggered when precursor seismic activity is detected.

20 Claims, 14 Drawing Sheets

U.S. PATENT DOCUMENTS

| | | | |
|---|---|---|---|
| 4,262,289 | 4/1981 | Rivera | 340/690 |
| 4,358,757 | 11/1982 | Perini | 340/540 |
| 4,612,506 | 9/1986 | Varotsos et al. | 324/348 |
| 4,616,320 | 10/1986 | Kerr et al. | 364/421 |
| 4,628,299 | 12/1986 | Tate et al. | 340/540 |
| 4,657,025 | 4/1987 | Orlando | 128/671 |
| 4,704,693 | 11/1987 | Thomas | 364/508 |
| 4,724,390 | 2/1988 | Rauscher et al. | 324/344 |
| 4,825,165 | 4/1989 | Helms et al. | 324/323 |
| 4,849,947 | 7/1989 | Baule et al. | 340/566 |
| 4,884,030 | 11/1989 | Naville et al. | 324/344 |
| 4,904,943 | 2/1990 | Takahashi | 324/344 |
| 5,001,466 | 3/1991 | Orlinsky et al. | 340/690 |
| 5,101,195 | 3/1992 | Caillat et al. | 340/690 |
| 5,144,598 | 9/1992 | Engdahl et al. | 367/181 |
| 5,148,110 | 9/1992 | Helms | 324/323 |
| 5,151,838 | 9/1992 | Dockery | 340/310.01 |

OTHER PUBLICATIONS

*Earthquake Prediction: Nine Major Earthquakes in China*, Ma Zongjin et al., 1990, pp. 105–111, 178, 180–182.

"MF–10 Universal Monolithic Dual Switched Capacitor Filter", *Data Acquisition Databook*, National Semiconductor Corp., 1993 pp. 7–197–67–213.

"Multi–Function Analog and Digital I/O Card", *Master Source Book*, Industrial Computer Source, 1994, p. 25.

"Single/Dual/Quad, 28MHZ, Low Noise, Low Voltage, Precision Op Amps", *Data Book vol. III*, Maxim, 1994, pp. 3–33 to 3–43.

*Vibration & Shock Sensor Selection Guide*, PCB Piezotronics, 1993, pp. cover page, 1, 42–43, 92–102, 104–105.

"Solion Infrasonic Microphone", *Journal of the Acoustical Society of America*, Collins et al., 1964, pp. 1283–1287.

"Infrasonics", *Ultrasonics*, 1969, pp. 30–35.

"Correlation of Naturally Occurring Infrasonics and Selected Human Behavior", *Journal of the Acoustical Society of America*, Green and Dunn, 1968, pp. 1456–1457.

"Ein Beitrag zur Lautstärkemessung impulshaltiger Schalle", *Acustica*, von E. Zwicker, 1966, pp. 1–10.

"Field Measurement of Infrasonic Noise", *Acustica*, Hood and Leventhall, 1971, pp. 10–13.

"A Simple Frequency–Modulation Tape Recorder System", *Electronic Engineering*, Tempest and Bryan, 1967, pp. 87–89.

"Measurements of Infrasound from Artificial and Natural Sources," *Journal of Geophysical Research*, Fehr, 1967, pp. 2403–2417.

"Effects of Low Frequency and Infrasonic Noise on Man", *Aerospace Medicine*, Mohr et al., 1965, pp. 817–824.

"The Effects of 'Föhn' Weather on Accident Rates in the City of Zurich (Switzerland)", *Aerospace Medicine*, Moos, 1964, pp. 643–645.

"The Effects of 'Föhn' Weather on the Human Population of the Principality of Liechtenstein", *Aerospace Medicine*, Moos, 1963, pp. 736–739.

"Silent Sound Can Make You Nervous, Exhausted and Physically Ill", McCrindell, pre–1994, p. 1.

"The Silent Sound that Kills", *Science & Mechanics*, Dunning, 1968, pp. 31–33, pp. 75–76.

"The Acoustical Laser", pre–1994, pp. 9–11.

"What levels of infrasound are safe?", *New Scientist*, Brown, 1973, pp. 414–415.

"Can some people hear the jet stream?", *New Scientist*, Hanlon, 1973, pp. 415–416.

"Ultrasonic anti–theft devices—a new hazard?", *New Scientist*, Gable, 1973, p. 416.

"LM124 et seq. Low Power Quad Operational Amplifiers", *General Purpose Linear Devices Databook*, National Semi--Conductor Corp., 1989, 3–405 to 3–417.

METHOD AND APPARATUS FOR DETECTING LOCAL PRECURSOR SEISMIC ACTIVITY

This is a continuation-in-part (CIP) of application Ser. No. 08/424.409 filed on Mar. 10, 1994.

This application relates to a method and apparatus for detecting seismic activity, particularly for detecting local precursor seismic activity so as to forecast an impending earthquake.

The often devastating toll taken by earthquakes in life and property is well known. It has long been recognized that the toll could be reduced if people within an impending quake's focal area were warned to prepare. Although preparation is unlikely to prevent structural damage to commercial and residential buildings, or to infrastructure such as bridges and roadways, preparation could reduce deaths and serious injuries, for instance by people seeking appropriate shelter or retreating from dangerous locations, such as from unreinforced brick buildings. Moreover, preparation is likely to reduce the psychological trauma often attributable to an earthquake's sudden onslaught. In addition, preparation is likely to reduce personal property casualty such as that related to structural or utility failures, and the fires often associated therewith. Accordingly, it is desirable to provide a mechanism for forecasting the possible occurrence of an earthquake.

An earthquake's toll results from the seismic waves defining the earthquake. Seismic waves include two types: body waves and surface waves. Body waves comprise primary (or P) waves and secondary (or S) waves that propagate within the earth's body. P waves are longitudinal waves that alternately push (compress) and pull (dilate) the ground in the direction of propagation. S waves are transverse waves that shear the ground in planes perpendicular to the direction of propagation.

Surface waves comprise Love waves and Rayleigh waves that propagate at or near the earth's surface. Love waves shear the ground sideways at right angles to the direction of propagation, much like S waves, but without S waves' vertical shearing. Rayleigh waves displace the earth both vertically and horizontally in a vertical plane that lies in the direction of propagation, whereby a particle of earth will travel an elliptical path as the wave passes, much like a water molecule in rolling ocean waves.

Body waves travel more rapidly than surface waves. Of the surface waves, Love waves generally travel faster than Rayleigh waves and, of the body waves, P waves generally travel faster than S waves. When an earthquake is occurring, the P waves are felt first, like a thud or blow, and thereafter the S waves arrive, as indicated by up-and-down and side-to-side motion. Thereafter, the surface waves strike, causing the ground to shake side-to-side and to roll.

The body and surface waves generally are monitored during an earthquake to gauge the earthquake's intensity. Being contemporaneous with and defining earthquakes, these waves cannot be used for forecasting. Forecasting relies on identification of other physical parameters that, in their occurrence or variance, indicate an impending earthquake. These parameters, when indicating an impending earthquake, are sometimes referred to herein as "precursor seismic activity".

Techniques have heretofore been proposed for forecasting earthquakes relying on sensing various physical parameters These parameters have included changes in animal behavior patterns, build-up of strain in the rocks of the earth's crust, changes in seismic P wave velocities, uplift and tilt of the earth, increases in the emission of radon gas, and changes in the earth's electrical resistivity, magnetic and electromagnetic fields, or current. Other physical parameters, as well as apparatuses and techniques for sensing these parameters, have also been proposed in attempts to detect precursor seismic activity so as to forecast impending earthquakes. However, the techniques using these parameters have not provided adequate forecasting due to, among other things, difficulty in detection of precursor seismic activity therefrom.

Accordingly, there is a need for an improved method and apparatus for detecting seismic activity, particularly precursor seismic activity so as to forecast an impending earthquake.

SUMMARY OF THE INVENTION

The present invention fulfills the aforementioned need by providing a method and apparatus that senses one or more of several physical parameters, including infrasonic atmospheric acoustic waves, electromagnetic waves having frequencies from approximately 0 Hz through 35 Hz and seismic waves having frequencies from approximately 0 Hz through 15 Hz, so as to detect precursor seismic activity. The acoustic waves are sensed using an infrasonic transducer that produces an electrical signal representative of sensed acoustic waves. The electromagnetic waves are sensed using a suitable antenna. The antenna preferably comprises the power grid so as to accommodate the long wavelength of these extremely low frequency waves. The antenna produces an electrical signal representative of sensed electromagnetic waves. The seismic waves are sensed by using an accelerometer sensitive to the low frequency, long wavelength, low amplitude and associated acceleration of these waves, and produces an electrical signal representative of sensed seismic waves.

The electrical signals, so produced, are used to detect precursor seismic activity. In one embodiment of the invention, all of the electrical signals are routed to an analog-to-digital converter that converts the signals into digital signals which, in turn, are routed to a processing unit for detection of precursor seismic activity. The detection mechanism preferably is implemented in digital signal processing (DSP) circuitry.

In another embodiment, the electrical signal representative of the electromagnetic radiation is passed through a low-pass filter to defeat undesirable high-frequency components, and is then passed through one or more high-Q band-pass filters to isolate one or more desired frequency components. The isolated components are then convened to digital signals that are provided to the processing unit for detection of precursor seismic activity. The signals representative of the acoustic waves and seismic waves in this embodiment preferably are processed, and precursor seismic activity detected, substantially similarly to that of the first embodiment.

In another embodiment, the physical parameter sensed is skin waves which travel along the earth's surface and which are associated with the infrasonic atmospheric acoustic waves. The skin waves are sensed using one or more sensing mechanisms which produce electrical signals representative of the waves. The electrical signals, so produced, are routed via signal conditioning circuitry to a detection mechanism for detection of precursor seismic activity. The detection mechanism preferably is implemented in digital signal processing (DSP) circuitry.

The processing unit preferably controls an I/O stage. The I/O stage alerts the user of a potentially impending earthquake in any of various ways, e.g., using audio, display or other alarms. The processing unit triggers the I/O stage's alarms when precursor seismic activity is detected.

Accordingly, it is a principle object of the present invention to provide a novel and improved method and apparatus for detecting seismic activity.

It is another object of the present invention to provide such a method and apparatus wherein seismic activity is detected so as to forecast an impending earthquake.

It is a further object of the present invention to provide such a method and apparatus so as to forecast an impending earthquake by sensing a physical parameter so as to detect precursor seismic activity indicated therein.

It is yet another object of the present invention to provide such a method and apparatus wherein more than one precursor physical parameter is sensed to detect precursor seismic activity, so as to forecast an impending earthquake.

It is yet a further object of the present invention to provide such a method and apparatus wherein more than one physical parameter is sensed so that forecasts of an impending earthquake are made at selected times in advance of the quake, each advance time associated with detections using one of the sensed physical parameters.

It is another object of the present invention to provide such a method and apparatus wherein infrasonic atmospheric acoustic waves, electromagnetic waves in the 1–35 Hz frequency band, and seismic waves having frequencies in the 1–15 Hz frequency band are sensed, alone or in combination.

It is still another object of the present invention to provide such a method and apparatus wherein skin waves traveling along the earth's surface are sensed, alone or in combination, with other physical parameters.

It is a further object of the present invention to provide such a method and apparatus using digital signal processing circuits to recognize waveforms indicative of an impending earthquake.

It is yet another object of the present invention to provide such a method and apparatus for forecasting an impending earthquake with sufficient advance notice to permit preparatory measures to be taken, so as to reduce deaths, injuries, psychological trauma and property damage that may result from the earthquake.

It is yet a further object of the present invention to provide such method and apparatus that is easy to use, economical, reliable and portable.

The foregoing and other objects, features and advantages of the invention will be more readily understood upon consideration of the following detailed description of the invention, taken in conjunction with the accompanying drawings.

DETAILED DESCRIPTION OF THE INVENTION

Figure 1:
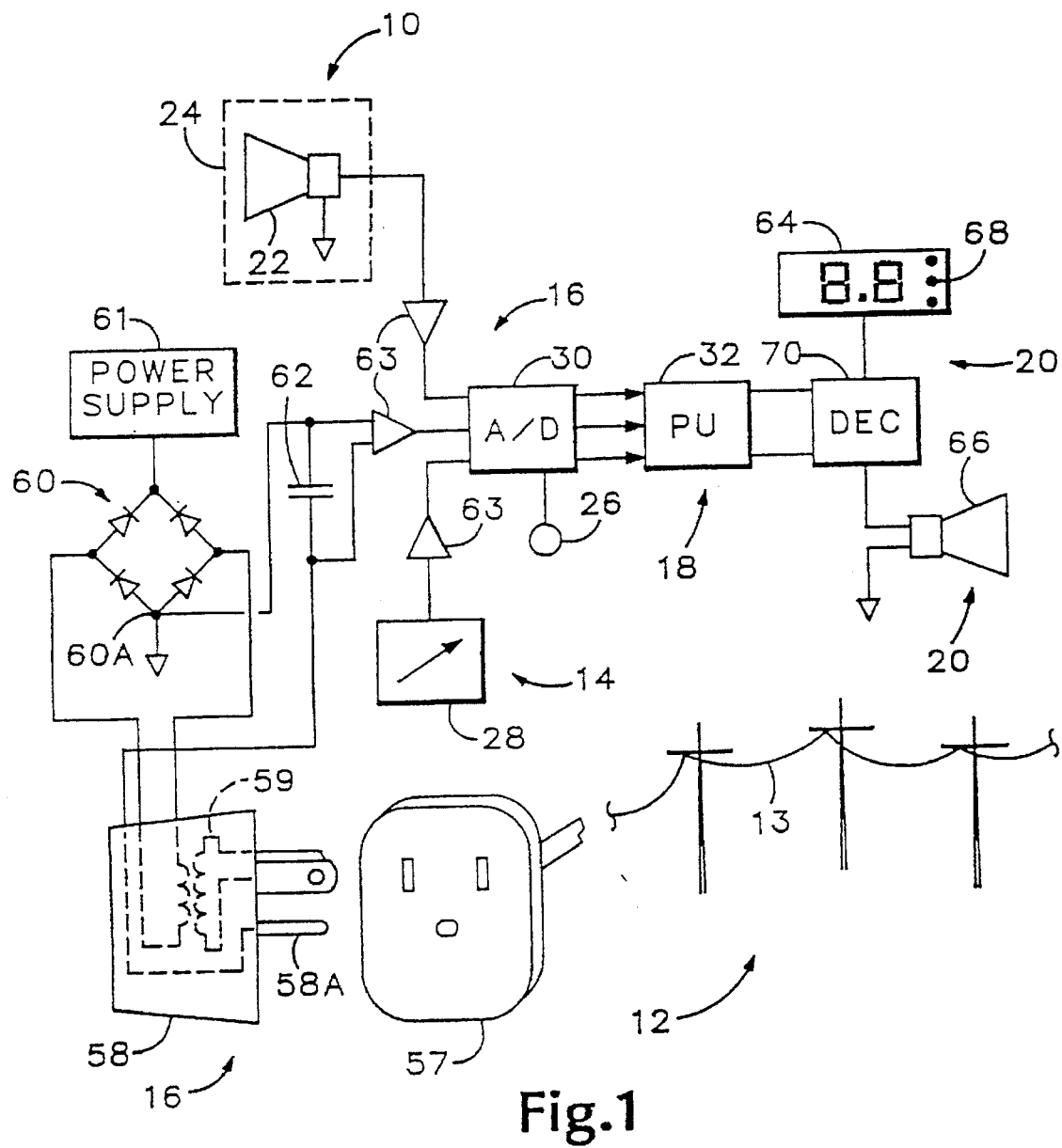
FIG. 1 is a block diagram of an apparatus for sensing predetermined electromagnetic, acoustic and seismic waves and detecting precursor seismic activity therefrom, according to the present invention.

Referring to FIG. 1, an apparatus for detecting precursor seismic activity includes an acoustic wave sensing mechanism 10, an electromagnetic wave sensing mechanism 12, a seismic wave sensing mechanism 14, a signal conditioning mechanism 16, a detection mechanism 18 and an input/output (I/O) stage 20.

The physical parameters sensed by respective sensing mechanisms 10, 12 and 14 include (i) atmospheric acoustic waves (ii) electromagnetic waves, and (iii) seismic waves. These waves individually, or in combination, are associated with precursor seismic activity. Accordingly, proper sensing and detection of these waves individually, or in combination, provides for forecasting of earthquakes. The acoustic waves correspond to seismic waves associated with precursor seismic activity, the seismic waves propagating in the earth and ultimately emerging at the surface of the earth for transmission into the atmosphere as infrasonic acoustic waves inaudible to humans. Forecasts based on sensing these acoustic waves typically precede an associated quake by approximately 3 days. Precursor seismic activity is also detectable in electromagnetic waves having frequencies from approximately 0 Hz through 35 Hz, or seismic waves having frequencies from approximately 0 Hz through 15 Hz, or both. Forecasts based on sensing these electromagnetic waves, which are characterized by low amplitude and long wavelengths, typically precede an associated earthquake by approximately a week or more. Similarly, forecasts based on sensing these seismic waves, which also are characterized by low amplitudes and long wavelengths, typically precede an associated earthquake by time periods measured in seconds up to minutes.

The acoustic wave sensing mechanism 10 preferably comprises a transducer 22 sensitive to predetermined acoustic waves propagating in the atmosphere. The transducer 22, in a preferred embodiment, senses acoustic waves having frequencies from approximately 0 Hz through 15 Hz, i.e., infrasonic acoustic waves. In addition, the transducer 22 preferably is tuned so as to substantially reject acoustic waves outside that bandwidth. It is to be recognized, however, that transducers sensitive to other, broader or narrower, bandwidths may be used without departing from the principles of the invention.

The transducer 22 produces an electrical signal representative of sensed acoustic waves. Preferably, the transducer 22 is not sensitive to ambient atmospheric pressure, or temperature, or changes in either. However, where the transducer is sensitive to pressure or temperature, or changes therein, measures preferably are implemented to defeat any such sensitivity. To that end, the transducer 22 as shown in FIG. 1 is enclosed in a sealed chamber 24 so as to defeat sensitivity to pressure or changes therein. In addition, temperature sensor 26 is employed which senses ambient temperature and produces a signal representative thereof so as to provide for compensation of any temperature sensitivity of the transducer 22. Compensation preferably is implemented by characterizing and responding to the transducer's deviations from ideal performance relative to temperature. It is to be recognized that various techniques for excluding, compensating or otherwise defeating any transducer sensitivity to atmospheric pressure or temperature, or changes therein (or other ambient phenomena, or spurious waves associated therewith, to which the transducer 22 may be sensitive) are known in the art and may be employed without departing from the principles of the invention.

In using the apparatus, the transducer 22 preferably is installed for substantially optimal reception of infrasonic acoustic waves, so as to maximize the range and reliability of the apparatus. The infrasonic acoustic waves not only are generally inaudible to people, but also are of such low amplitude that they can only be sensed using a sensing mechanism 10, such as the transducer 22. However, sensing using a transducer 22 may be impeded, particularly by damping. Damping occurs, for instance, as the waves propagate away from the earth's surface. Accordingly, the transducer 22 preferably is installed on or adjacent the earth's surface. Preferably, the transducer 22 is installed within 25 feet of the earth's surface.

Figure 2:
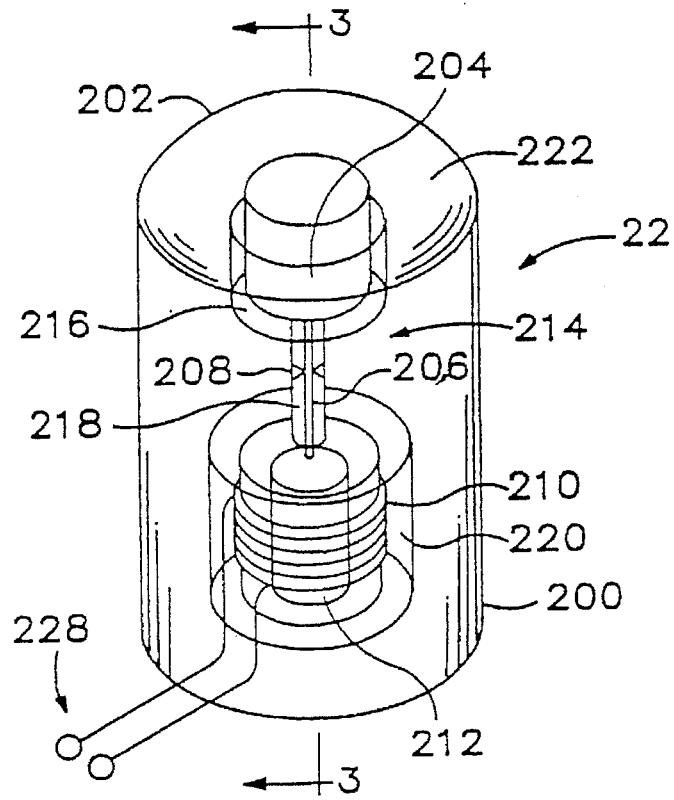
FIG. 2 is perspective view of a mechanism for sensing acoustic waves according to the present invention.
Figure 3:
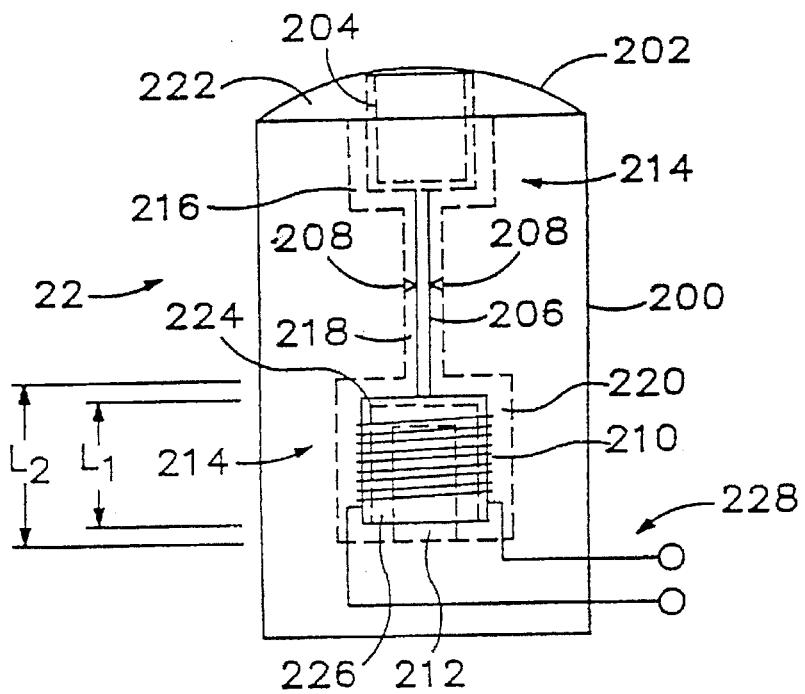
FIG. 3 is a side, partial cross section of the mechanism of FIG. 2, taken along line 3—3 thereof.

A preferred embodiment of the transducer 22, as shown in FIGS. 2 and 3, comprises a body 200, diaphragm 202, a first transmission element 204, a connector 206, bearing elements 208, a coil 210, and a magnet 212. As further described below, the diaphragm 202 is attached to one end of the body 200. In turn, the first transmission element 204, at one end, is affixed to the diaphragm 202 and at the other end, is affixed to one end of the connector 206. The connector 206 is affixed at its other end to the coil 210.

The body 200 has a chamber 214 disposed in one end thereof, the chamber 214 comprising an outer portion 216, middle portion 218 and an inner portion 220. The body 200 preferably is constructed using ceramic materials, but it is to be recognized that other materials, such as plastics or metals, may be employed without departing from the principles of the invention. The body 200 preferably has a substantially cylindrical shape, having a length of about 1.5 inches and a cross-sectional diameter of about 1 inch.

The diaphragm 202 preferably has a substantially domed shape, the dome having an enclosed volume 222 and a base diameter substantially equal to the cross-sectional diameter of the body 200. At its base, the diaphragm 202 is affixed to the body 200, adjacent the outer portion 216 of the body's chamber 214. The diaphragm 202, so affixed, seals the body 200, thereby creating a cavity 224. The cavity 224 comprises the chamber 214 and the diaphragm's enclosed volume 222, and has a predetermined atmospheric pressure therein. The predetermined atmospheric pressure preferably provides for substantially mid-range operation of the transducer 22. That is, the pressure is not so low or high (relative to the range of ambient atmospheric pressures likely to be encountered in operation) that the transducer's sensitivity to infrasonic acoustic waves is substantially impeded. In the alternative, the cavity 224 may be vented to the ambient atmosphere by means of a small hole in the body 200 so that static pressures on both sides of the diaphragm 202 are substantially equalized and only sound pressure is sensed. The diaphragm 202 preferably is constructed using ceramic materials, and has a thickness of 0.001 to 0.002 inches, and is affixed to the body 200 using an adhesive capable of creating and maintaining the seal. It is to be recognized, however, that other shapes, materials, thicknesses, or affixation agents or mechanisms, such as ultrasonic welding, may be employed without departing from the principles of the invention.

The first transmission element 204 preferably is constructed using ceramic materials, and is affixed to the diaphragm 202 using ultrasonic welding. The transmission element 204 preferably is fixed at a plurality of points, along a circular line, or over a relatively large surface. It is to be recognized, however, that other materials, affixation agents or mechanisms, or affixation geometries may be employed therefor, without departing from the principles of the invention.

The connector 206 preferably comprises a metal pin, although other materials may be used without departing from the principles of the invention.

The coil preferably comprises 60 gauge wire, wound around a second transmission element 224, and having output leads 228. The second transmission element 224 preferably is constructed using ceramic materials and has a longitudinal aperture 226 disposed on the end of the element 224 opposite affixation to the connector 206. The aperture 226 preferably is shaped as a right-cylinder, as described further below. The coil 210 preferably has a resistance of 168 ohms. It is to be recognized, however, that other materials and shapes may be employed without departing from the principles of the invention.

The first transmission element 204, affixed to the diaphragm 202, is disposed in the outer portion 216 of the chamber 214, extending up into the diaphragm's enclosed volume 222. In turn, the connector 206 is disposed through the chamber s middle portion 218, and the coil 210 is disposed in the chamber's inner chamber 220. The connector 206 preferably is aligned and slidably supposed in the middle potion 218 by the bearing elements 208. The bearing elements 208 preferably comprise three ruby jewels disposed at the approximate mid-point of the chamber's middle portion 218, substantially at 120° to one another.

The first transmission element 204, the connector 206 and the coil 210 are disposed so as to be aligned in respective portions 216, 218 and 220. In addition, the first transmission element 204, the connector 206 and the coil 208 preferably have cross-sectional shapes substantially corresponding to the shapes of the respective portions 216, 218 and 220, all having smaller cross-sectional dimensions than those respective portions. For example, the outer and inner portions 216 and 220 of the chamber 214, as shown, have substantially round cross-sectional shapes and the first transmission element 204 and the coil 210 disposed respectively therein preferably have substantially round cross-sectional shapes of smaller diameters than the portions 216 and 220. In addition, the coil 210 has a length $L_1$ that is shorter by a predetermined amount than the length $L_2$ of the chamber's inner portion 220. The difference between $L_1$ and $L_2$ preferably is determined so as to accommodate the range of displacement that coil 210 is likely to encounter in operation.

Having such dispositions, shapes and dimensions relative to respective portions 216, 218 and 220, the first transmission element 204, the connector 206 and the coil 210 move substantially unimpeded within the respective portions 216, 218 and 220. It is to be recognized, however, that the cross-sectional shapes of the first transmission element 204, the connector 206 and the coil 210 may correspond to shapes other than the shapes of respective portions 216, 218 and 220 without departing from the principles of the invention, provided the relative shapes allow substantially unimpeded movement therebetween.

The magnet 212 is affixed to the body 200 at the closed end of the chamber's inner portion 220. Although the magnet 212 preferably is a permanent magnet, it is to be recognized that the magnet 212 may be constructed using any suitable material without departing from the principles of the invention. It is also to be recognized that the magnet 212 may be affixed to the body 200 using adhesive or other affixation agents or mechanisms without departing from the principles of the invention. The magnet 212 is shaped so that the magnet is accommodated within the aperture 226 of the coil's second transmission element 224. Because the aperture 226 preferably has a right-cylindrical cross-sectional shape, the magnet 212 preferably is shaped as a right-cylinder, having a diameter less than that of the aperture 226. The length of the magnet 212 is selected in light of the relative lengths $L_1$ of the coil 210 and $L_2$ of the chamber's inner portion 220, respectively, so as to accommodate the range of displacement the coil 210 is likely to encounter in operation.

In operation, the transducer 22 produces an electrical signal representative of sensed acoustic waves, by sensing changes in sound pressure. That is, the infrasonic acoustic waves reciprocally deflect the diaphragm 202. The diaphragm's reciprocal movement is transmitted to the coil 210 by the first transmission element 204 and the connector 206. The coil's movement relative to the magnet 212 generates the electrical signal, according to fundamental principles of physics. The signal is produced at the leads 228. In this embodiment, the transducer 22 is largely insensitive to ambient atmospheric pressure, or changes therein, that relate to weather patterns. Accordingly, the transducer 22 of FIG. 2 may be used in the absence of the chamber 24 shown in FIG. 1, without departing from the principles of the invention.

The seismic wave sensing mechanism 14 preferably comprises an accelerometer 28 sensitive to predetermined accelerations. The accelerometer 28, in a preferred embodiment, detects accelerations manifest at the earth's surface associated with seismic waves. More specifically, the accelerometer 28 preferably is sensitive to seismic waves having (i) frequencies from approximately 0 Hz through 15 Hz, and (ii) accelerations on the order of milli-g's, where "g" is the standard unit of acceleration equal to 32.17 ft/sec$^2$. In addition, the accelerometer 28 preferably is tuned so as to substantially reject waves having frequencies outside the 0-15 Hz band. It is to be recognized, however, that accelerometers 28 sensitive to other, broader or narrower bandwidths, amplitude ranges or acceleration ranges, may be used without departing from the principles of the invention.

The accelerometer 28 produces an electrical signal representative of sensed seismic waves. Preferably the accelerometer 28 comprises one or more piezoelectric seismic accelerometers, but it is to be recognized that other types of accelerometers, including micromercuy switches, may be used without departing from the principles of the invention. Various types of piezoelectric accelerometers are described in the Vibration and Shock Sensor Selection Guide, SSG-601, by PCB Piezotronics, particularly pages 42–43 for low cost accelerometers, and pages 92–105 for general descriptions of operation, configuration, selection and installation. That Guide is hereby incorporated by reference.

The electromagnetic wave sensing mechanism 12 senses predetermined electromagnetic frequencies and produces an electrical signal representative thereof. The sensing mechanism 12, in a preferred embodiment, comprises an antenna sensitive to electromagnetic waves having frequencies from approximately 0 Hz through 35 Hz. It is to be recognized, however, that an antenna sensitive to other, broader or narrower, bandwidths may be used without departing from the principles of the invention.

The electromagnetic wave sensing mechanism 12 preferably employs the AC power lines 13 that are widely used to distribute power from and among power generating facilities and ultimately to end-user's such as homes, office and the like. The AC power lines 13 make up a complex network of wire, often referred to as the power grid, and have characteristics particularly suitable for sensing the predetermined frequencies of electromagnetic waves. First, by basic principles of antenna design theory, a wire antenna sensitive to electromagnetic waves of approximately 35 Hz preferably has a length on the order of $10^6$ kilometers, which length increases for lower frequencies. The AC power lines 13 provide a practical wire antenna having a suitably long overall length. Second, the low-frequency electromagnetic waves associated with precursor seismic activity tend to propagate substantially vertically from the earth's surface and are of relatively low power, such that an antenna sensing such waves preferably is disposed horizontal to and adjacent the earth's surface. The AC power lines 13 provide such antenna as the lines generally are strung substantially horizontally to and relatively close to the earth's surface. Third, the apparatus is intended for use in forecasting earthquakes at geographically diverse locations, so as to require antennas at such locations. The AC power lines 13 substantially blanket vast geographic areas and generally may be individually and readily tapped at homes, offices and other locations where the apparatus is likely to be used. Moreover, in blanketing vast geographic areas, the AC power lines 13 provide an antenna capable of sensing precursor seismic activity that, although relatively remote from the user, may manifest as an earthquake at the user's location. It is to be recognized, however, that the AC power lines 13 inadequately cover some geographic areas and, indeed, leave entirely uncovered other geographic areas; in those areas, the apparatus may be implemented using an electromagnetic wave sensing mechanism 12 comprising an antenna of other design, such as loop or coil antennas, tuned for the predetermined frequency bandwidth.

The respective electrical signals produced by the respective sensing mechanisms 10, 12 and 14 are routed to the signal conditioning mechanism 16. The signal conditioning mechanism 16 conditions the electrical signals so as to produce signals suitable for use by the detection mechanism 18 in the detection of precursor seismic activity. The signal conditioning mechanism 16 may comprise transformers, rectifiers, voltage dividers, filters, amplifiers or compensation circuitry, in various combinations, so as to, among other things, optimize selectivity and sensitivity, to compensate for non-ideal behavior in the sensing mechanisms 10, 12 or 14, to minimize effects of noise, or to perform other functions. The signal conditioning mechanism 16 preferably produces digital signals, but it is to be recognized that the mechanism 16 could produce analog signals or digital signals, or a combination of both, without departing from the principles of the invention. If digital signals are produced, in particular if the detection mechanism 18 is implemented using digital circuitry, the signal conditioning mechanism 16 preferably comprises, as shown in FIG. 1, an analog-to-digital converter (ADC) 30 which converts the respective signals of sensing mechanisms 10, 12 and 14 into digital signals representative of such analog signals and, correspondingly, representative of the sensed acoustic waves, electromagnetic waves, and seismic waves, respectively. (Hereafter, the electrical signals produced by respective sensing mechanisms 10, 12 and 14 will sometimes be referred to as detect signals.)

The ADC 30 preferably also receives the temperature signal produced by the temperature sensor 26. The ADC 30 converts that signal to a digital temperature signal for use by the detection mechanism 18 in compensating for any temperature-related inaccuracies of the acoustic wave sensing mechanism 10.

The signal conditioning mechanism 16, as respects the electromagnetic wave sensing mechanism 12, preferably comprises a standard three-prong plug 58 insertable in a standard three-receptacle wall socket 57, as are present in a home, office or the like. The plug 58, when inserted in the socket 57, connects to the sensing mechanism 12, i.e., the AC power lines 13. Preferably the three-prong plug 58 comprises a transformer 59 so as to reduce the line voltage to a voltage level suitable for other signal conditioning operations. The detect signal produced by the transformer 59 is provided to a full wave rectifier 60 having a device ground tap 60A. The device ground tap 60A is coupled to one terminal of a capacitor 62, and to one input of an amplifier 63. The capacitor's other terminal is coupled to the amplifier's other input and to earth ground, preferably through prong 58A when the plug 58 is inserted in socket 59. So referenced to earth ground, the detect signal is amplified and provided to the ADC 30 for digital conversion. Although as shown the rectifier 60 is employed, it is to be recognized that the rectifier may be omitted from the signal conditioning mechanism 16 without departing from the principles of the invention, as the rectifier's primary purpose is to provide rectified power to power supply circuitry 61. The capacitor 62 preferably is nonpolarized and typically has capacitance of 1-50 microfarads.

As discussed further hereinafter with reference to FIGS. 6 through 9, additional analog circuitry is employed in a second embodiment of the signal conditioning mechanism respecting signals produced by electromagnetic wave sensing mechanism 12.

The signal conditioning mechanism 16, as respects the acoustic and seismic wave sensing mechanisms 10 and 14, preferably comprises amplifiers 63 for amplifying the respectively-produced detect signals. The amplifiers 63 preferably comprise low noise precision operational amplifiers, for instance MAX414 operational amplifiers manufactured by MAXIM Integrated products, Inc. of Sunnyvale, Calif.

The detect signals produced by the signal conditioning mechanism 16 are routed to the detection mechanism 18. The detection mechanism 18 processes the detect signals so as to detect predetermined waveforms generally indicative of precursor seismic activity that may be present in any of the detect signals.

The detection mechanism 18, as shown in FIG. 1, comprises a processing unit 32 that receives the detect signals from the ADC 30. The processing unit 32 may be implemented using a programmed microprocessor, programmed digital signal processor, or other processing circuits performing digital signal processing operations. In addition, the detection mechanisms may be integrated in a single application specific integrated circuit (ASIC), together with some or all of the signal conditioning mechanism 16, or other circuitry, or both. It is to be recognized that the detection mechanism 18 may be implemented in analog circuitry without departing from the principles of the invention.

Figure 4:
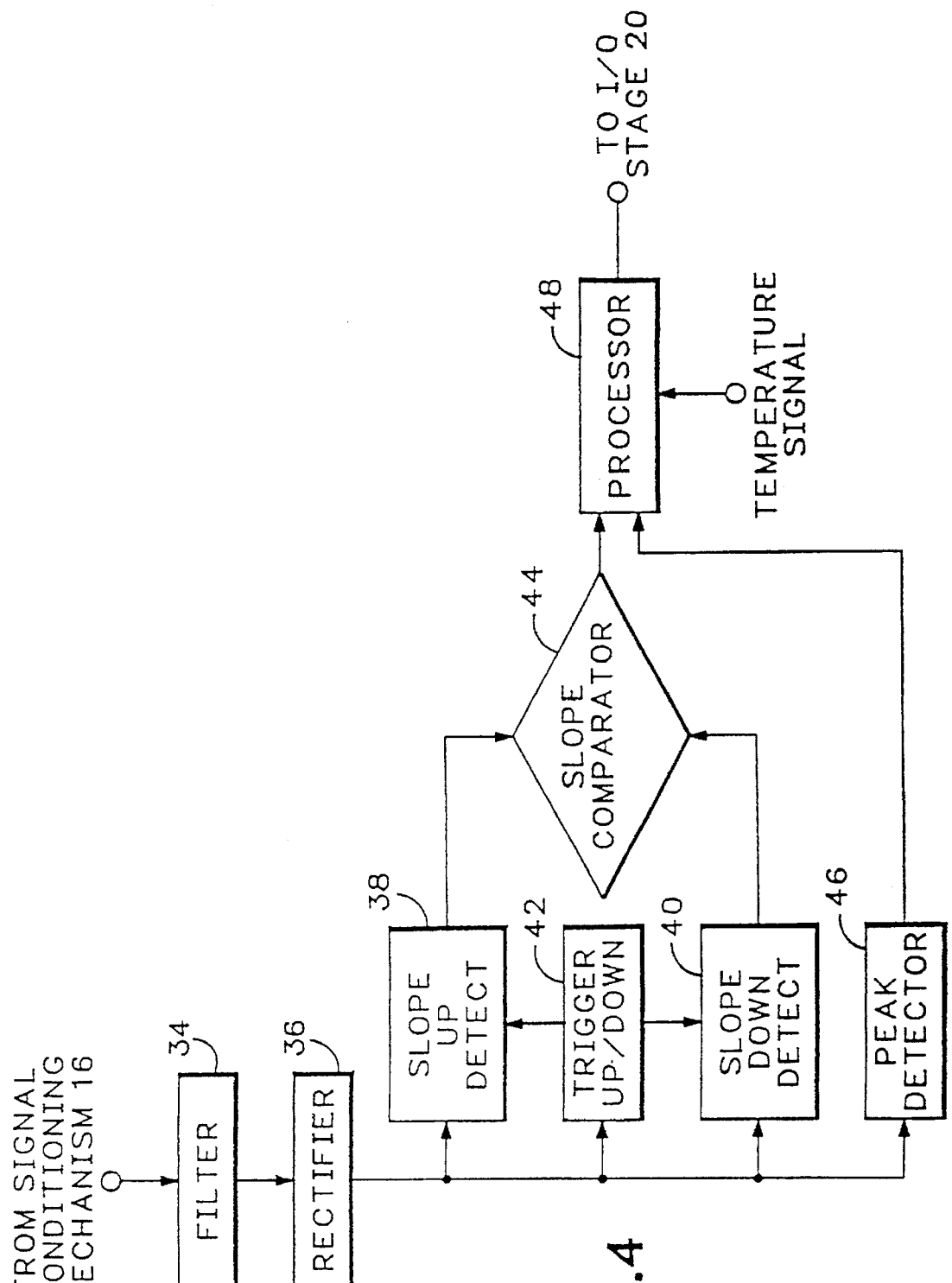
FIG. 4 is a block diagram of a mechanism for detecting precursor seismic activity using sensed acoustic waves or seismic waves, according to the present invention.

Turning to FIG. 4, the processing unit 32 is shown in functional blocks representative of digital signal processing operations performed on detect signals associated with the acoustic and seismic wave sensing mechanisms 10 and 14. The processing unit 32 is substantially the same for both types of waves, except that the processing unit 32 also performs temperature compensation with respect to the detect signals associated with acoustic waves, as described above, using digital information corresponding to the temperature sensor's signal. It is to be recognized, however, that temperature compensation may be performed outside the detection mechanism 18 without departing from the principles of the invention. It is also to be recognized that various techniques may be employed to exclude, compensate or otherwise detect temperature or other undesirable sensitivities that may be manifest by components other than the acoustic wave sensing mechanism 10, without departing from the principles of the invention. In particular, it is preferred for extreme applications, wherein the apparatus is subject to relatively high temperatures, to provide temperature compensation for all affected circuitry.

The processing operations corresponding to acoustic and seismic waves comprise filter 34, rectifier 36, slope up detector 38, slope down detector 40, slope trigger 42, slope comparator 44, peak detector 46 and seismic magnitude processor 48. In operation, the filter 34 receives detect signals from the signal conditioning mechanism 16. The filter 34 defeats undesirable frequency components present in the detect signals. The undesirable frequency components, as described above, generally are those above 15 Hz. Thence, the filter 34 preferably comprises a low-pass filter having a cut-off frequency substantially of 15 Hz. It is to be recognized, however, that the filter 34 may be other than a low-pass filter having a 15 Hz cut-off frequency, without departing from the principles of the invention. For example, the filter 34 may have a narrower or wider bandwidth, so as to filter out noise or to pass fundamentals of signal frequency components determined to have forecasting significance and, in so configuring the filter's response, the filter 34 may have characteristics of a band-pass filter or a notch filter, or both.

The detect signal, so filtered, is routed to the rectifier 36. The rectifier 36 preferably is a full-wave rectifier so as to retain substantially all of the remaining detect signal for subsequent processing operations performed by the detection mechanism 18. However, it is to be recognized that a half-wave rectifier may be used without departing from the principles of the invention.

The detect signal, so rectified, is routed to each of the slope up detector 38, the slope down detector 40, the slope trigger 40 and the peak detector 46. The peak detector 46 detects the maximum amplitude of the peaks of the detect signal and provides that information to the seismic magnitude processor 48. The peak detector 46 preferably resets at a predetermined interval, typically every 1 second, so as to provide relatively current information to the processor 48.

The slope up detector 38, slope down detector 40 and slope trigger 42, in conjunction with the slope comparator 44, detect waveforms present in the detect signal indicative of precursor seismic activity. The slope trigger 42 determines when the detect signal crosses a predetermined voltage threshold and the signal's direction at each such crossing, that is whether the signal is increasing or decreasing in amplitude. When such crossing occurs, the slope trigger 42 produces a triggering signal that is routed to the slope up or slope down detector 38 or 40 corresponding to the signal's direction. The triggering signals cause the detectors 38 and 40 to detect the respective slopes of consecutive pairs of upwardly and downwardly directed transitions of the detect signal. The detectors 38 and 40 produce respective upward and downward slope signals that are routed to and stored by the slope comparator 44. The slope comparator 44 compares the relative magnitudes of the respective slope signals. If the slope comparator 44 determines that the magnitude of the slope of an upwardly directed transition is greater than that of the corresponding downwardly directed transition, the slope comparator 44 produces a predetermined comparator signal that is routed to the seismic magnitude processor 48 to indicate that precursor seismic activity is present. Otherwise, the comparator signal indicates the absence of such activity. So as to compare the slope of an upwardly directed transition with the slope of the associated downwardly directed transition, the slope comparator 44 resets the stored downward slope value upon receipt of each upward slope signal.

The seismic magnitude processor 48, responsive to signals from the slope comparator 44, produces control signals that are routed to the I/O stage 20. For comparator signals associated with seismic waves, the seismic magnitude processor 48 preferably produces a digital signal indicative of the presence or absence of precursor seismic activity. For comparator signals associated with acoustic waves, the seismic magnitude processor 42 preferably produces a digital signal indicative of the presence or absence of precursor seismic activity. If such activity is present, the seismic magnitude processor 48 produces a signal indicative of the potential magnitude of the earthquake likely associated with the detected precursor seismic activity. The seismic magnitude processor 48 determines that magnitude using the current maximum amplitude of the detect signal's peaks, as detected by the peak detector 46. Preferably, the processor 48 is calibrated so as to optimize accuracy in this determination. Calibration may be accomplished by any method known in the art, including by empirically deriving the relationship between amplitude and earthquake magnitude and storing that relationship preferably in the processor 48, either by look-up table, by formula or by other means.

The seismic magnitude processor 48, when calculating the magnitude of a potential earthquake, preferably also adjusts the calculation to compensate for any temperature-related inaccuracies, as well as for any inaccuracies associated with other ambient phenomena, as described above.

Figure 5:
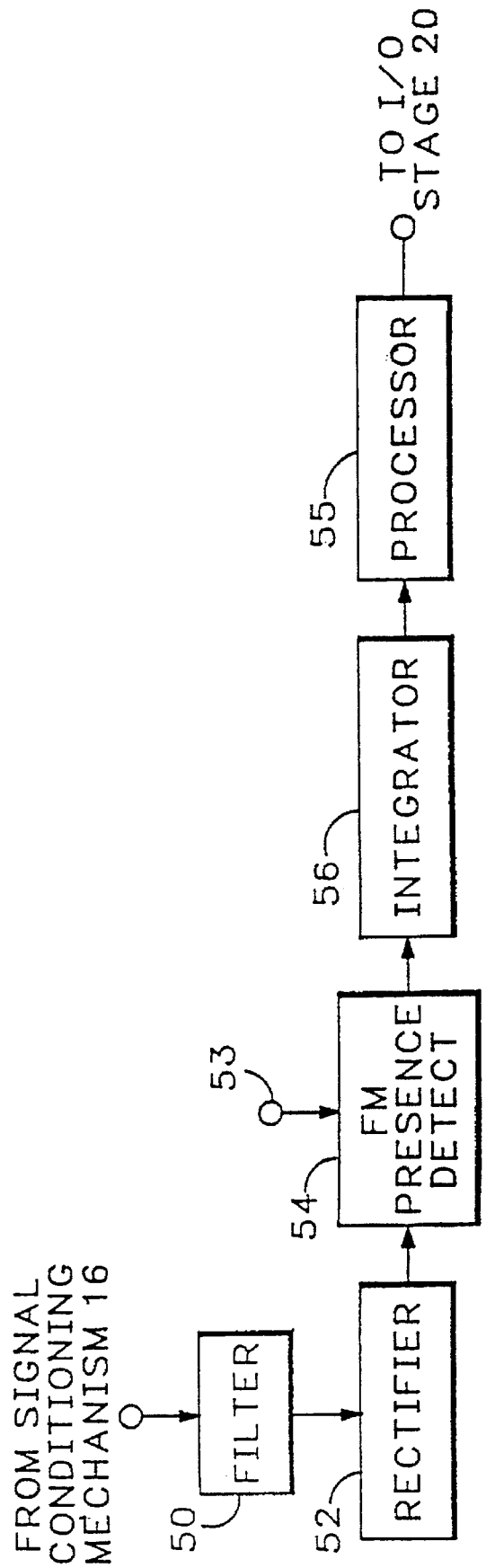
FIG. 5 is a block diagram of a mechanism for detecting precursor seismic activity using sensed electromagnetic waves, according to the present invention.

Turning to FIG. 5, the detection mechanism 18 is shown in functional blocks representative of digital signal processing operations performed on detect signals associated with the electromagnetic wave sensing mechanism 12. The processing operations comprise filter 50, rectifier 52, presence detector 54, integrator 56 and seismic magnitude processor 55. In operation, the filter 50 and rectifier 52 operate in substantially the same way as described above for, respectively, the filter 34 and the rectifier 36 used in conditioning detect signals associated with the acoustic and seismic wave sensors 10 and 14. However, the filter 50 preferably comprises a low-pass filter having a cut-off frequency substantially of 35 Hz. Moreover, the rectifier 52 preferably comprises a half-wave rectifier.

The EM presence detect 54 receives the rectified detect signal from the rectifier 52, as well as a predetermined threshold signal 53. The EM presence detect 54 compares the amplitude of the detect signal to the threshold signal. If the detect signal amplitude is at or above the threshold signal's amplitude, the EM presence detect 54 produces a presence signal that is routed to the integrator 56. The threshold signal 53 preferably is selected based on various factors, including the desired geographic range of the device (generally higher thresholds correspond to decreased range), and gains and losses of the signal conditioning mechanism 16. The presence signal preferably is a digital signal wherein a first value indicates the presence of precursor seismic activity and a second value indicates the absence of such activity.

The integrator 56 integrates the presence signal over time. The integrator 56 stores and outputs an integrated presence signal that is routed to the processor 55. A non-zero value of the integrated presence signal indicates precursor seismic activity and, thence, indicates that an earthquake is likely to occur. The magnitude of the integrated presence signal generally is related to the magnitude of the indicated earthquake. That is, the duration of time over which the detect signal remains at or above the threshold signal generally is related directly to the magnitude of the indicated earthquake.

The integrator 56 resets the integrated presence signal if the presence signal indicates the absence of precursor seismic activity for a predetermined period of time. Typically, that period of time is from about 6 to about 20 hours.

The processor 55 receives the integrated presence signal output by the integrator 56 and, responsive thereto, produces signals that are routed to the I/O stage 20. The processor 55 preferably produces a digital signal indicative of the presence or absence of precursor seismic activity and, if such activity is present, the processor 55 preferably produces a signal indicative of the potential magnitude of the earthquake associated with the detected precursor seismic activity. The processor 55 determines that magnitude using the magnitude of the integrated threshold signal. Preferably, the processor 55 is calibrated so as to maximize accuracy in this determination. Calibration may be accomplished by any method known in the art, including by empirically deriving the relationship between the magnitudes, and storing that relationship in the processor 55, either by look-up table, by formula or by other means.

The I/O stage 20 alerts the user of a potentially impending earthquake. As shown in FIG. 1, the I/O stage preferably comprises both a display alarm 64 and an audio alarm 66. It is to be recognized, however, that the I/O stage 20 may comprise these or other alarms, individually or in combination, without departing from the principles of the invention.

In operation, the I/O stage 20 receives control signals produced by the seismic magnitude processor 48 and the processor 55 indicative of precursor seismic activity detected in sensed acoustic, electromagnetic and seismic waves. The I/O stage 20, upon receipt of any one or more signals indicative a potentially impending earthquake, triggers the display alarm 64 or the audio alarm 66, or both. The display alarm 64 preferably comprises an alphanumeric display of the lo impending earthquake in terms of its magnitude, e.g., a Richter scale display. The display alarm 64 preferably further comprises indicator lights 68 for alerting the user as to whether the alarm is based on detections related to electromagnetic, acoustic or seismic waves. To that end, three indicator lights 68 are employed, each one corresponding to one of the sensing mechanisms 10, 12 and 14. When acoustic and electromagnetic waves concurrently indicate precursor seismic activity, the display alarm 64 reciprocates the displayed information between the two waves, and the indicator lights 68 indicate the detected wave being displayed at any time.

As previously described, precursor seismic activity can be detected at different times in advance of the earthquake. Accordingly, the alarms preferably alert of any likely near-term earthquake. In particular, the audio alarm 66 is responsive to precursor seismic activity detected in seismic waves, because the advance time between such detection and the onslaught of the earthquake is typically on the order of seconds to minutes. Preferably, the audio alarm 66 includes a clear alert corresponding specifically to that detection. For example, the alarm 66 may have a predetermined pitch, cadence or volume, or a combination thereof.

The I/O stage 20 preferably comprises a decoder mechanism 70 for receiving the various signals from the processing unit 32, for decoding those signals and for producing driver signals corresponding to the display alarm 64 and the audio alarm 66. Although the decoder mechanism 70 is shown as a separate element of the I/O stage 20, it is to be recognized that the decoder mechanism 70 may be otherwise implemented without departing from the principles of the invention. For example, the display alarm 64 and the audio alarm 66 may include circuitry for receiving and decoding the signals produced by the processor unit 32 so as to drive the respective alarms. In addition, it is to be recognized that the decoder mechanism 70 may be integrated in the detection mechanism 18, particularly in the processing unit 32, without departing from the principles of the invention.

Figure 6:
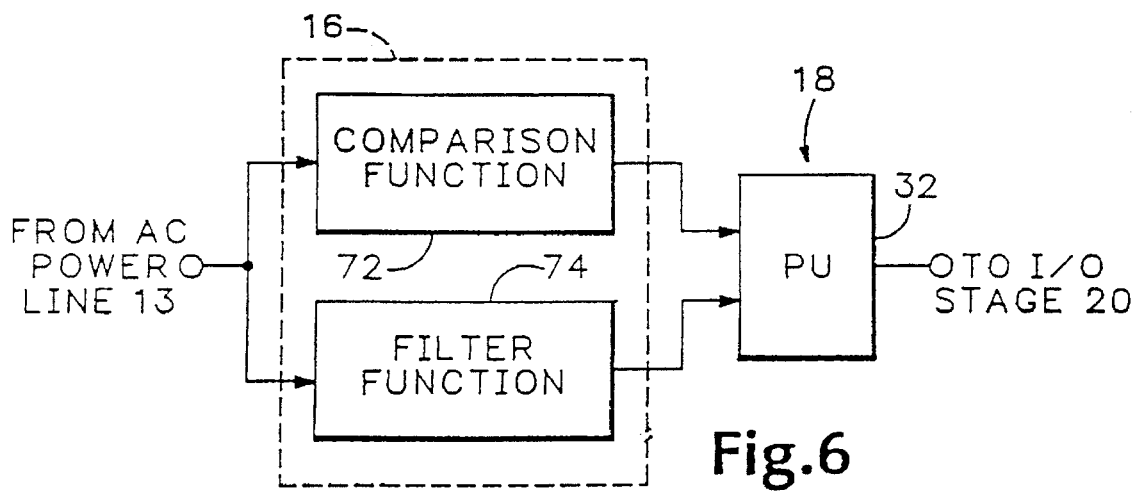
FIG. 6 is a block diagram of an alternative mechanism for detecting precursor seismic activity from sensed electromagnetic radiation, according to the present invention.

Turning to FIGS. 6 through 9, a second embodiment of the signal conditioning mechanism 16 is shown respecting conditioning the detect signal associated with the electromagnetic wave sensing mechanism 12. As shown in FIG. 6, the second embodiment of the signal conditioning mechanism 16 receives the detect signal produced by the electromagnetic wave sensing mechanism 12, routing the detect signal in parallel both to a comparison function 72 and to a filter function 74. The filter function 74 produces frequency components from the detect signal in predetermined bandwidths for interpretation by the detection mechanism 18. The comparison function 72 produces a rejection signal representative of the detect signal, that rejection signal being used by the detection mechanism 18 to determine whether the detect signal indicates potential precursor seismic activity or merely noise. If the rejection signal indicates merely noise, the frequency components produced by the filter function 74 are rejected by the detection mechanism 18; otherwise, the components are interpreted so as to determine whether precursor seismic activity is indicated by any one or more of the frequency components.

Figure 7A:
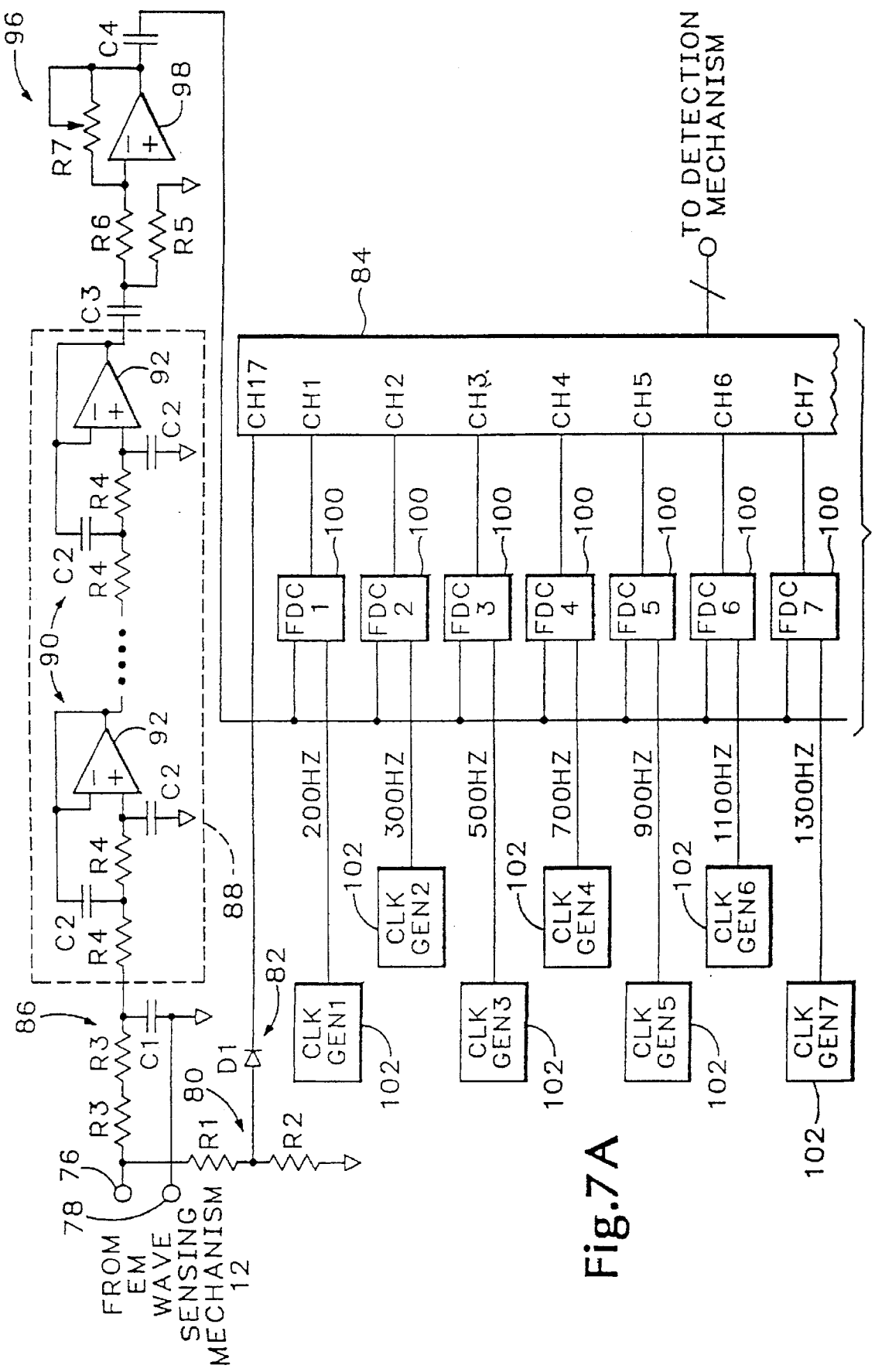
FIGS. 7A and 7B are schematic diagrams of the circuit of FIG. 6, according to the present invention.
Figure 7B:
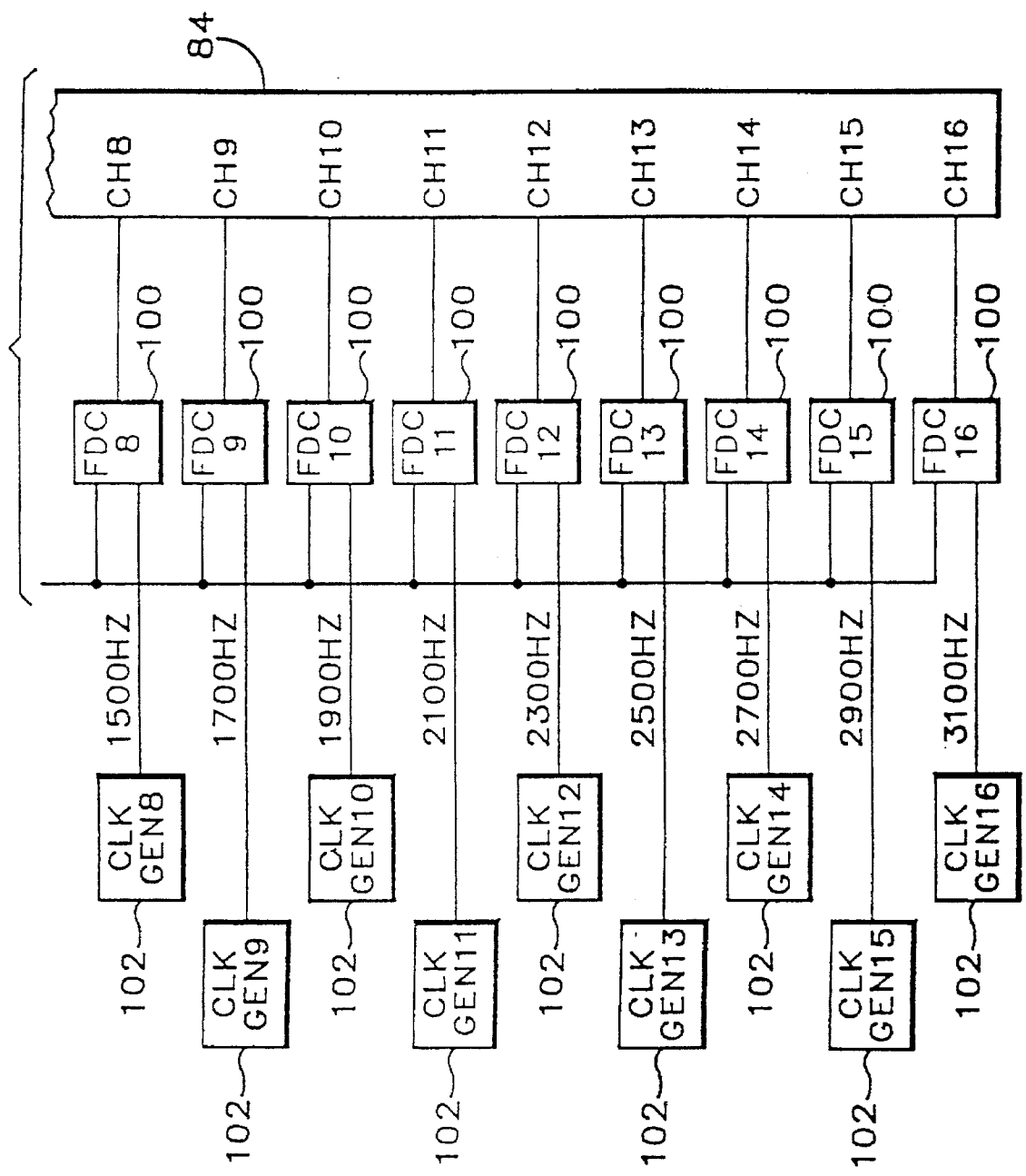

Turning to FIGS. 7A and 7B, the signal conditioning mechanism 16 comprises a first lead 76 and a second lead 78 connecting the mechanism 16 to the electromagnetic wave sensing mechanism 12. Where the sensing mechanism 12 comprises the AC power lines 13, the first lead 76 preferably is coupled to the hot or neutral lines of the wall socket 57 in a home, office or the like. Similarly, the second lead 78 preferably connects to the earth ground of such socket 57.

The comparison function 72 comprises a voltage divider 80 connected to the first lead 76 to receive the detect signal sensed by the electromagnetic wave sensing mechanism 12. The voltage divider 80 reduces the detect signal's voltage range to within the dynamic range of subsequent circuitry of the signal conditioning mechanism 16. As shown, resistor R1 preferably has a resistance of 180 Kilohm, and resistor R2 preferably has a resistance of 5 Kilohm. From the voltage divider 80, the detect signal is routed to a rectifier 82. The rectifier 82 preferably is a half-wave rectifier comprising a diode D1. As shown, the diode D1 is an 1N914, made by Motorola, Inc. of Schaumburg, Ill. From the rectifier 82, the detect signal is routed to an analog-to-digital converter (ADC) 84 which produces the rejection signal by converting the detect signal from analog to digital. The rejection signal is provided to the detection mechanism 18 as described above.

The filter function 74 comprises a frequency-dependant voltage divider 86 so as to defeat undesirable frequency components of the detect signal. The voltage divider 86 preferably is implemented as a low-pass filter. As shown, the voltage divider 86 comprises two serially-connected resistors R3 connected to the sensing mechanism 12 by the first lead 76, and a grounded capacitor C1 that is connected at its grounded terminal to the second lead 78. Resistors R3 preferably each have resistances of 50 Kilohm, and capacitor C1 preferably has capacitance of 1 microfarad and is non-polarized. So implemented, the frequency-dependent voltage divider 86 defeats higher-frequency components and, in particular, reduces the 60 Hz/120 V line voltage to about every 5 V or less, peak to peak.

The detect signal is routed from the divider 86 to a low-pass filter 88 so as to further defeat undesirable high frequency components. The low-pass filter 88, as shown, is implemented using ganged active filters 90, as known to persons of ordinary skill in the art. The low-pass filter 88, so implemented, produces a relatively flat passband and a relatively steep stopband falloff. Although the low-pass filter 88 comprises two active filters 90, it is to be recognized that a greater or fewer number may be used without departing from the principles of the invention. Each active filter 90 comprises resistors R4 and capacitors C2 connected to an operational amplifier 92. Resistors R4 preferably have resistances of 50 Kilohm, and capacitors C2 preferably have capacitances of 0.18 microfarad. The operation amplifier 92 preferably is a LM324 produced by National Semiconductor Corporation of Santa Clara, Calif. The active filters 90, so constructed, have cut-off frequencies of approximately 17.7 Hz.

The detect signal is routed from the low-pass filter 88 to an adjustable amplifier 96. The adjustable amplifier 96, as shown, is implemented using operational amplifier 98, resistor R6 and variable resistor R7, connected so as to form an inverting amplifier as is known in the art. The operational amplifier 98 preferably is the above-described LM324, made by National Semiconductor Corporation. The resistor R6 preferably has resistance of 10 Kilohm, and the variable resistor R7 preferably has maximum resistance of 100 Kilohm, so as to provide an amplifier having a maximum gain of 10. In operation, the gain of the adjustable amplifier 96 preferably is adjusted so as to amplify the detect signal and thereby increase the apparatus' sensitivity, while maintaining the detect signal's amplitude within the dynamic range of subsequent circuitry of the signal conditioning mechanism 16.

The low pass filter 88 preferably is coupled to the adjustable amplifier 96 using capacitor C3 and resistor R5. The capacitor 63 isolates the adjustable amplifier 96 from DC drift, if any, of the low pass filter 88. The resistor R5 overcomes any leakage of capacitor C3 so as to hold the inverting input terminal of the operation amplifier 98 at substantially 0 V. Resistor R5 preferably has resistance of 1 megohm, and capacitor C3 preferably has a capacitance of 100 microfarad, and is non-polarized.

The detect signal is routed from the adjustable amplifier 96 through a coupling capacitor C4 to a predetermined plurality of frequency detect channels 100. The capacitor C4, as shown, preferably has a capacitance of 100 microfarad and is non-polarized so as to capacitively couple the adjustable amplifier 96 to the frequency detect channels 100.

In addition to the detect signal, each frequency detect channel 100 also receives a clock signal generated by a respective one of a plurality of clock generators 102. It is to be recognized that the clock generators 102 may be implemented in any way known in the art without departing from the principles of the invention. Each frequency detect channel 100 produces an output signal that is routed to the analog to digital converter (ADC) 84.

Figure 8:
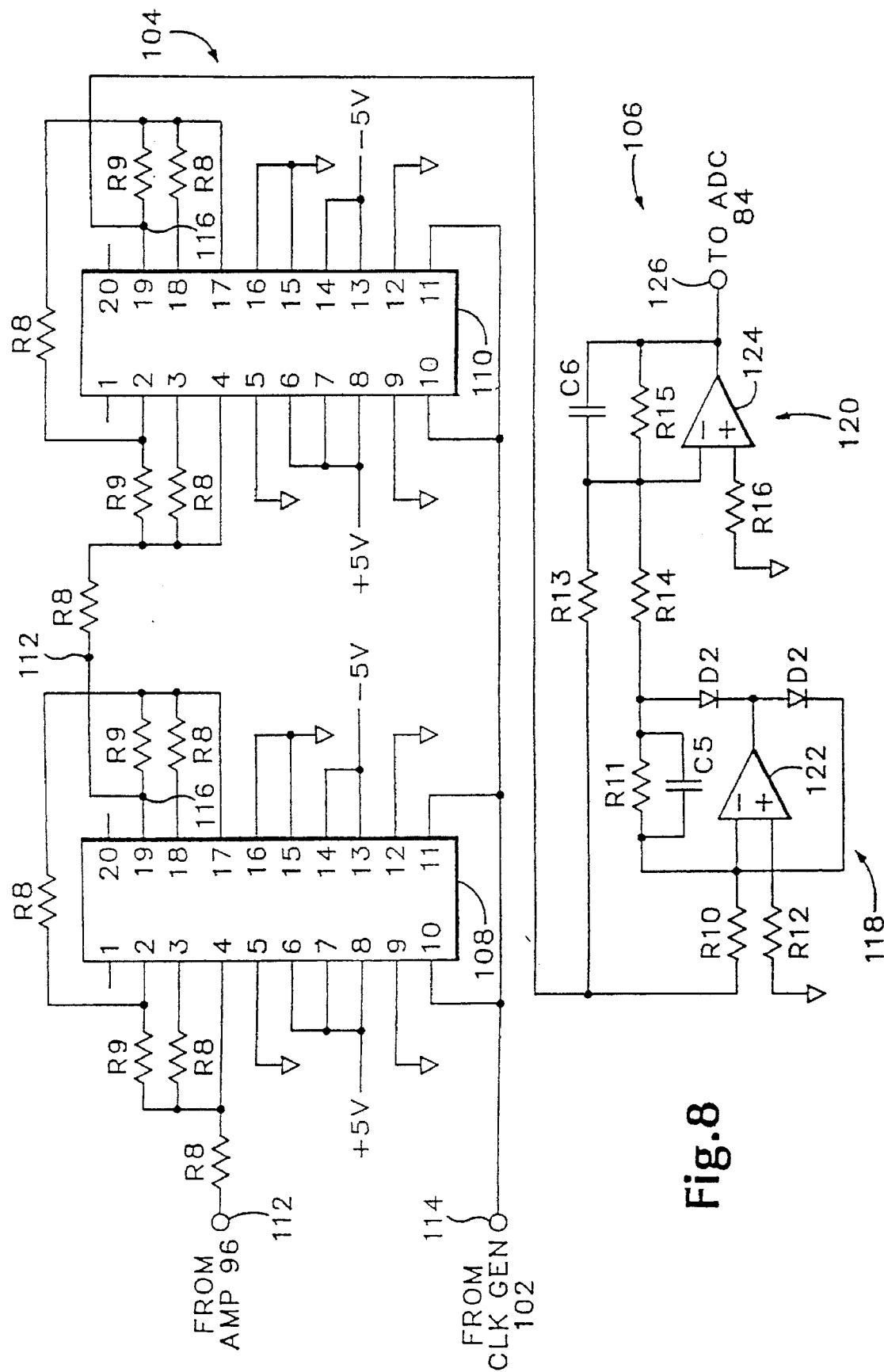
FIG. 8 is schematic diagram of a frequency detection channel (FDC) shown in FIGS. 7A and 7B, according to the present invention.

Turning now to FIG. 8, an exemplary frequency detect channel 100 is shown in greater detail. Each frequency detect channel 100 comprises a high-Q band-pass filter 104 and an AC-DC convertor 106. Each band-pass filter 104 preferably is implemented using one or more ganged MF10 universal monolithic switched capacitor filters, manufactured by National Semiconductor Corporation. As shown two such filters 108 and 110 are used. Each switched capacitor filter 108 and 110 has an input terminal 112, the input terminal 112 of filter 108 being capacitively coupled through capacitor C4 to the adjustable amplifier 96, so as to receive the detect signal. Each switched capacitor filter 108 and 110 also comprises a clock input terminal 114 connected to a respective one of the clock generators 102 so as to receive the clock signal generated thereby. Each of the switch capacitor filters 108 and 100 comprises an output terminal 116. The output terminal 116 of filter 108 is coupled to the input terminal 112 of filter 110, thereby ganging the filters 108 and 110 and providing for sufficient gain to maintain an adequate signal to noise ratio. The filters 108 and 110 are configured using a plurality of resistors R8 and a plurality of resistors R9. As shown in FIG. 8, resistors R8 preferably have resistances of 91 Kilohm and resistors R9 preferably have resistance of 1 Megohm.

The band-pass filter 104 of each frequency detect channel 100 has a passband gain and Q determined by the resistances R8 and R9, and a frequency band determined by the frequency of the clock signal received at respective clock input terminal 114. That is, the center frequency of each of the band-pass filters 104 is directly dependant on the frequency of the clock signal generated by the respective clock generator 102. As shown in FIGS. 7A and 7B, the clock generators 102 generate clock signals from 100 Hz to 3,100 Hz in 200 Hz increments. The band-pass filters 104 of respective frequency detect channels 100, in receipt of such clock signals, provide passbands having center frequencies of substantially 1 through 31 Hz, approximately in 2 Hz increments. The selection of resistances for resistors R8 and R9 determine the width of the pass bands. Using the resistances described above the pass band of each frequency detect channel 100 is approximately ±0.5 Hz for the lower frequency bands (that is, 1–12 Hz) to ±1.5 Hz for the higher frequency bands (that is, 12–31 Hz). Thence, the frequency detect channels 100, as shown, divide a predetermined bandwidth of the detect signal, i.e., 1 through 31 Hz, into 16 pass bands for routing to the ADC 84. It is to be recognized, however, that the detect signal's predetermined bandwidth may be less than or greater than 31 Hz, or may be divided into a greater or fewer number of passbands, or both, without departing from the principles of the invention.

In each frequency detect channel 100, the output terminal 116 of switched capacitor filter 110 is coupled to an associated AC-DC converter 106. Each AC-DC converter 106 comprises a rectifier 118 and a ripple filter 120. As shown, each rectifier 118 is an active circuit comprising an operational amplifier 122, resistors R10, R11 and R12, capacitor C5 and diodes D2 and D3, as known in the art. The operational amplifier 122 preferably is an LM324, made by National Semiconductor Corporation, the diodes D2 and D3 preferably are 1N914s, made by Motorola, Inc., the resistors R10 and R11 preferably have resistances of 20 Kilohm, the resistor R12 preferably has resistance of 15 Kilohm, and the capacitor C5 preferably has capacitance of 10 picofarad.

The rectifier 118 receives the detect signal from the associated switched capacitor filter 110 at the operational amplifier's inverting terminal. To that end, the rectifier 118 is coupled to the filter output terminal 116 through resistor R10. It is to be recognized that the detect signal, as received by each rectifier 118, comprises frequency components determined by the passband of the associated band-pass filter 104, that is, by the passband of the associated ganged switched capacitor filters 108 and 110.

Each ripple filter 120 preferably is a low-pass filter implemented so as to substantially remove ripple from the detect signal output by the AC-DC converter 106. As shown, the ripple filter 120 comprises an operational amplifier 124, resistors R13, R14, R15 and R16, and capacitor C6, forming an active low-pass filter as is known in the art. The operational amplifier 124 preferably is an LM324, made by National Semiconductor Corporation, the capacitor C6 preferably has capacitance of 10 microfarad and the resistors R13, R14, R15 and R16 preferably have resistances, respectively, of 20, 10, 22 and 6.2 Kilohm.

The filter 120 receives the detect signal at the operational amplifier's inverting terminal. The detect signal is received both from the switched capacitor filter 100, as coupled through resistor R13 and from the rectifier 118, as coupled through resistor R14. The ripple filter 120 outputs the detect signal at output terminal 126, the output terminal 126 coupling the filter 120 to the ADC 84. It is to be recognized that the detect signal output to the ADC 84 comprises substantially DC levels representative of the peak amplitude of the frequency components passed by the associated ganged switched capacitor filters 108 and 110. The DC levels preferably are within the dynamic range of the ADC 84. That range typically is 0 to 5 volts.

The ADC 84, preferably is a multi-channel converter board. One such converter board is the Model AI016-P, made by Industrial Computer Source of San Diego, Calif. The ADC 84 converts to digital the outputs of each frequency detect channel 100, and provides the digital information to the detection mechanism 18. It is to be recognized, however, that the ADC 84 may comprise other structures, including a single converter together with a multiplexing mechanism, as are known in the art, without departing from the principles of the invention.

The detection mechanism 18 receives from the ADC 84 digital signals representative of the detect signal as output by the filter function 74, in particular, as divided into a plurality of frequency-defined signals. The detection mechanism 18 also receives from the ADC 84 the rejection signal produced by the comparison function 72, as described above. The detection mechanism 18 preferably receives all of these signals substantially simultaneously. However, it is to be recognized that the detection mechanism 18 may receive such signals individually or in various combination, without departing from the principles of the invention. For example, the detection mechanism 18 may receive, in turn, one filter function signal together with the comparison function's rejection signal.

The detection mechanism 18 preferably polls the ADC 84 at a predetermined rate, typically 1,000 times per second, for a predetermined time, typically 20 seconds. The detection mechanism 18 so polls in order to track the maximum peak amplitude of each channel over that predetermined time. The detection mechanism 18 preferably logs the maximum peak amplitude of each of the polled channels of the ADC, thereby conserving memory space which generally is subject to practical limitations. After the amplitudes are logged, the detection mechanism 18 resets, and repeats this polling and logging procedure.

In operation, as previously described, the detection mechanism 18 determines from the rejection signal whether the filter function's signals indicate potential precursor seismic activity, or merely noise. Noise is indicated when the peak amplitude of the rejection signal equals or exceeds a predetermined value. Noise is indicated, for example, if the rejection signal exhibits peak amplitude fluctuations of ±3 V at a frequency of about 60 Hz. If noise is indicated, the detection mechanism 18 rejects the filter function's signals for a predetermined time. In the case of 60 Hz noise, the detection mechanism 18 rejects the signals for 20 seconds (this 20 second period corresponding to the polling duration described previously), and continues to reject the signals in each subsequent 20 second period until noise is not indicated. If noise is not indicated, the detection mechanism 18 interprets the filter function's signals to confirm whether precursor seismic activity is indicated and, if so, to forecast the occurrence and nature of the associated earthquake.

Precursor seismic activity is indicated when the peak amplitudes of a plurality of the respective signals produced by the filter function 74 equal or exceed a predetermined value over a predetermined time period. The exact plurality preferably is selected based on empirical calibration of the detect mechanism 18 so as to optimize the apparatus' performance. Typically, a majority of 10 to 12 channels comprise the selected plurality indicative of precursor seismic activity. The predetermined value generally is substantially the same for each channel, except at higher frequencies where the value may be decreased to compensate for losses associated with prior circuitry, particularly the filters of the signal conditioning mechanism 16. The predetermined value preferably is selected based on empirical calibration of the detection mechanism 18 so as to optimize the apparatus' performance. The predetermined time period also preferably is determined by empirical calibration. Typically, the time period is on the order of days. Empirical calibration is preferred because these parameters tend to vary with location, particularly because the depth of precursor seismic activity and other geophysical characteristics tend to vary geographically.

Figure 9:
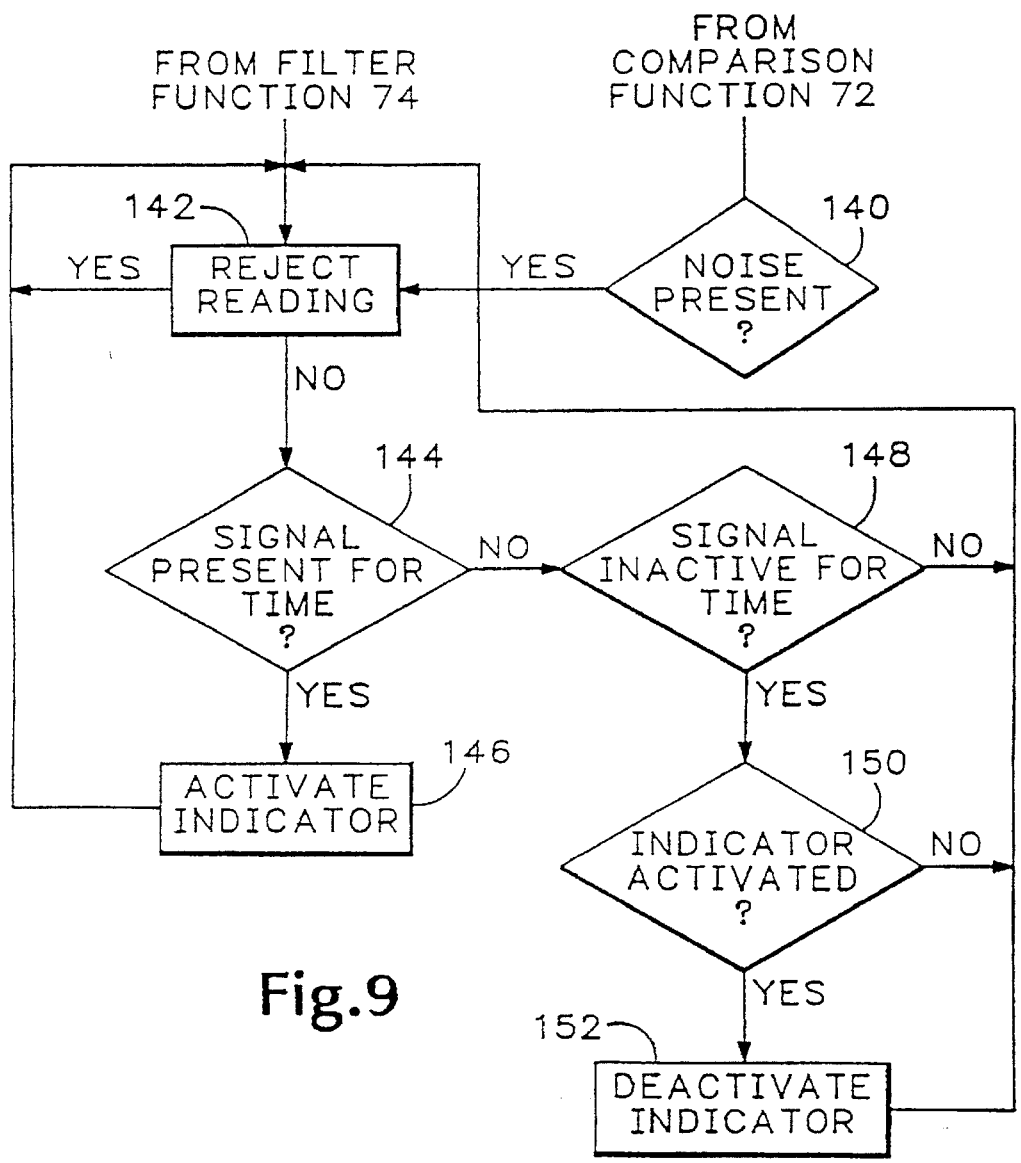
FIG. 9 is a flowchart of a process for detecting precursor seismic activity using the mechanism of FIG. 6, according to the present invention.

Turning to FIG. 9, the detection mechanism's operation using the rejection signal and the filter function's signals is depicted. In step 140, the detection mechanism 18 determines whether noise is present based on the rejection signal's content. If noise is present, the filter function's signals are rejected in step 142. Otherwise, the filter function's signals are analyzed, in step 144, to determine whether the signal is substantially present for at least the predetermined time period. The signal need not be always present during that time period. If the filter function's signals are substantially present for that duration, the detection mechanism 18 produces, in step 146, one or more control signals to drive one or more alarms of the I/O stage 20, so as to indicate a potential impending earthquake.

If the filter function's signals are not present for that duration, the detection mechanism 18, in step 148, determines whether the filter function's signals have been inactive, i.e., lacking indications of precursor seismic activity, over a predetermined duration. Typically, the time period is on the order of hours, and preferably is determined by empirical calibration. If the signals have not been inactive, the detection mechanism 18 returns to step 144. Otherwise, the detection mechanism 18, in step 150, determines whether one or more alarms of the I/O stage 20 are currently on, that is, alerting of a potentially impending earthquake. If not, the detection mechanism 18 returns to step 144. If any alarm is currently on, the detection mechanism 18 produces, in step 152, one or more control signals to deactivate all alarms.

Turning to FIGS. 10 through 13, another embodiment of an apparatus for detecting precursor seismic activity is shown. The physical parameter sensed by this embodiment includes skin waves that travel along and proximate the earth's surface, and that are thought to be associated with the infrasonic atmospheric acoustic waves previously described. It has been found that precursor seismic activity is detectable in skin waves individually, or in combination with other physical parameters, particularly in skin waves having frequencies from approximately 0 Hz through 15 Hz. Forecasts based on sensing these waves to detect precursor seismic activity have been found typically to precede the associated quake by approximately one to three days.

Figure 10:
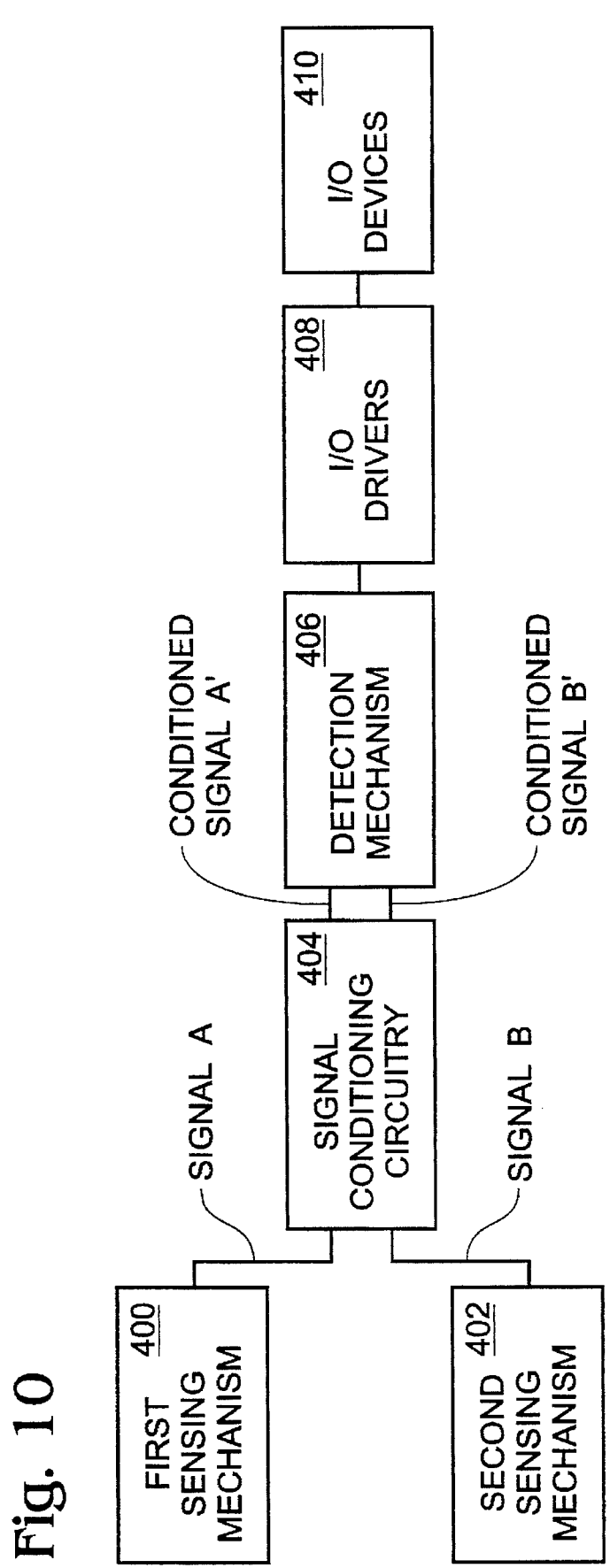
FIG. 10 is a block diagram of an apparatus for sensing predetermined skin waves and detecting precursor seismic activity therefrom, including sensing mechanisms and I/O devices, in accordance with the present invention.

Referring now to FIG. 10, an apparatus for sensing skin waves and detecting precursor seismic activity therein includes first sensing mechanism 400, second sensing mechanism 402, signal conditioning circuitry 404, detection mechanism 406, I/O drivers 408 and I/O devices 410. The first and second sensing mechanisms 400 and 402 sense predetermined skin waves so as to produce respective electrical signals A and B representative of the wave. The electrical signals, so produced, are routed to the signal conditioning circuitry 404. The signal conditioning circuitry 404 conditions the electrical signals so as to produce respective conditioned signals A' and B' suitable for use by the detection mechanism 406, including by filtering and amplifying the electrical signal. (In that regard, the signal conditioning circuitry 404 of FIG. 10 may be implemented substantially similarly to that described above with reference to FIG. 1, as well as in other ways known in the art. Accordingly, this element is not described further here.)

The conditioned signals A' and B' are routed to the detection mechanism 406, which processes the conditioned signals so as to detect predetermined waveforms generally indicative of precursor seismic activity. If such activity is detected, the detection mechanism 406 produces control signals that are routed to the I/O drivers 408 which, in turn, produce driver signals to drive the I/O devices 410. The I/O devices 410 comprise any selected displays, alarms, recording instruments, communication devices or the like. (In that regard, the I/O drivers 408 and I/O devices 410 may be implemented as described above with reference to the I/O stage 20 of FIG. 1, as well as in other ways known in the art. Accordingly, these elements are not described further here.)

Figure 11A:
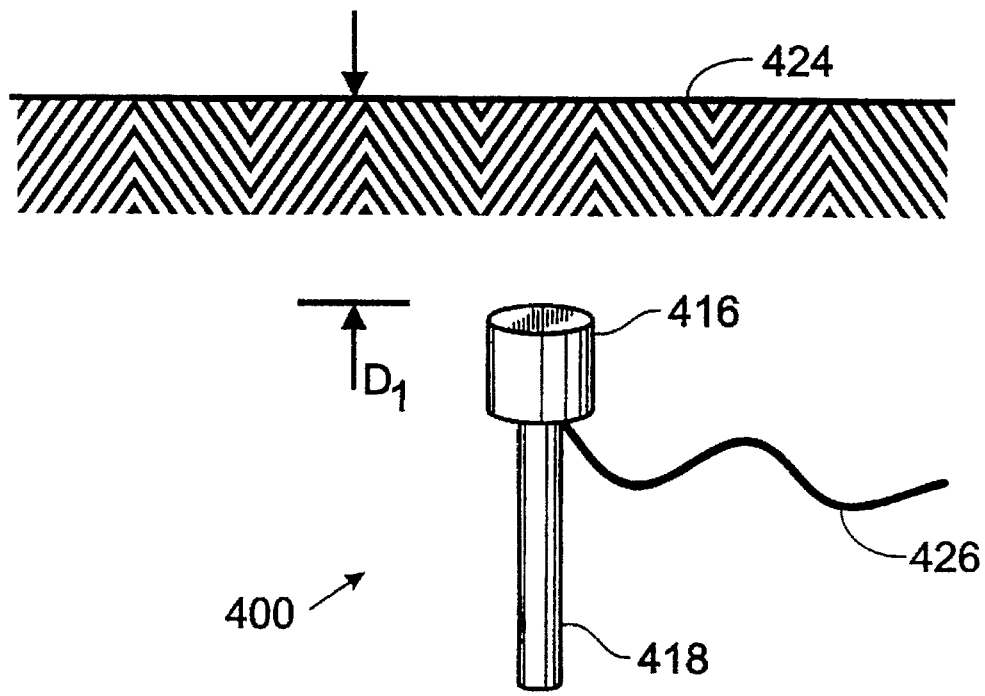
FIG. 11A is a perspective view of an exemplary implementation of one of the sensing mechanisms of FIG. 10.
Figure 11B:
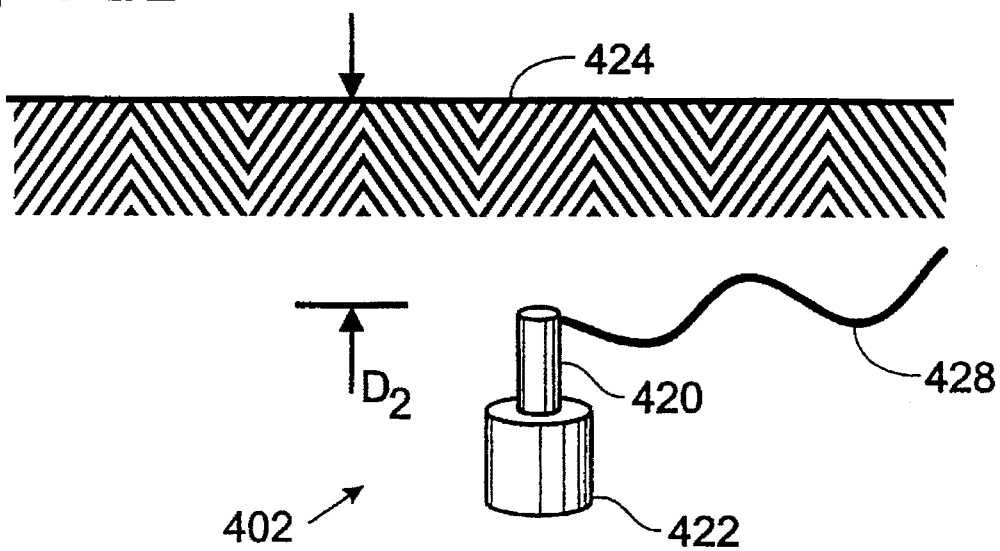
FIG. 11B is a perspective view of an exemplary implementation of the second sensing mechanism of FIG. 10.

Referring now to FIGS. 11A and 11B, the first and second sensing mechanisms 400 and 402 are implemented using conventional seismic accelerometers in association with respective first and second base elements 412 and 414. The base elements 412 and 414 have predetermined shape, dimensions and mass, and comprise predetermined materials, so as to tune the sensing mechanisms 400 and 402 to the desired skin waves, while rejecting other waves and physical parameters. It has been found effective to construct the first sensing mechanism 400 using an accelerometer 416 which is rated at 20 mV/g and is coupled to a rod 418, the rod being approximately 2' in length and 0.25" in cross-sectional diameter and being formed of stainless steel. In addition, it has been found effective to construct the second sensing mechanism 402 using an accelerometer 420 which is rated at 10 V/g and is coupled to a rod 422, the rod being approximately 3" in length and 3" in cross-sectional diameter and being formed of stainless steel. Preferably, the rods 418 and 422 are screwed to the respective accelerometers 416 and 420. It has been found that piezoelectric accelerometers perform adequately in implementing the sensing mechanisms 400 and 402, including those offered by PCB Piezotronics, as described above and for which information has previously been incorporated by reference.

In use, the first and second sensing mechanisms 400 and 402 preferably are installed for substantially optimal reception of the skin waves. As shown, the mechanisms 400 and 402 are installed below, but proximate, the earth's surface 424, at depths $D_1$ and $D_2$. In a preferred embodiment, the uppermost portion of the accelerometers 416 and 420 are each disposed approximately 6" below the earth's surface 424, with the associated rods 418 and 422 extending further below the surface therefrom. However, the skin waves can have energy at depths other than 6", and either or both sensing mechanisms 400 and 402 may perform optimally at depths other than 6", these differences being based on various factors including, for example, (i) the nature of the earth at and below the surface 424, (ii) the mass, dimensions and material of the rods 418 and 422, and (iii) the performance characteristics of the accelerometers 416 and 420. Accordingly, it is to be recognized that either or both the first and second sensing mechanisms 400 and 402 can be installed at depths other than 6" without departing from the principles of the invention.

It is also to be recognized that the sensing mechanisms 400 and 402 may be installed at orientations different than as shown, without departing from the principles of the invention. For example, second sensing mechanism 402 may be positioned so that its longitudinal axis is substantially parallel to the earth's surface 424 and is pointed in any selected direction. In addition, although, as shown, two separate sensing mechanisms 400 and 402 are employed, it is to be recognized that one sensing mechanism may be used to generate a composite electrical signal comprising the information of each of the signals generated by the separate mechanisms 400 and 402, without departing from the principles of the invention.

As shown, the electrical signals A and B produced by the sensing mechanisms 400 and 402 are routed to the signal conditioning circuitry 404 and detection mechanism 406 over leads 426 and 428, respectively. It is to be recognized, however, that routing may be accomplished by other means, e.g. radio transmission, without departing from the principles of the invention.

Figure 12A:
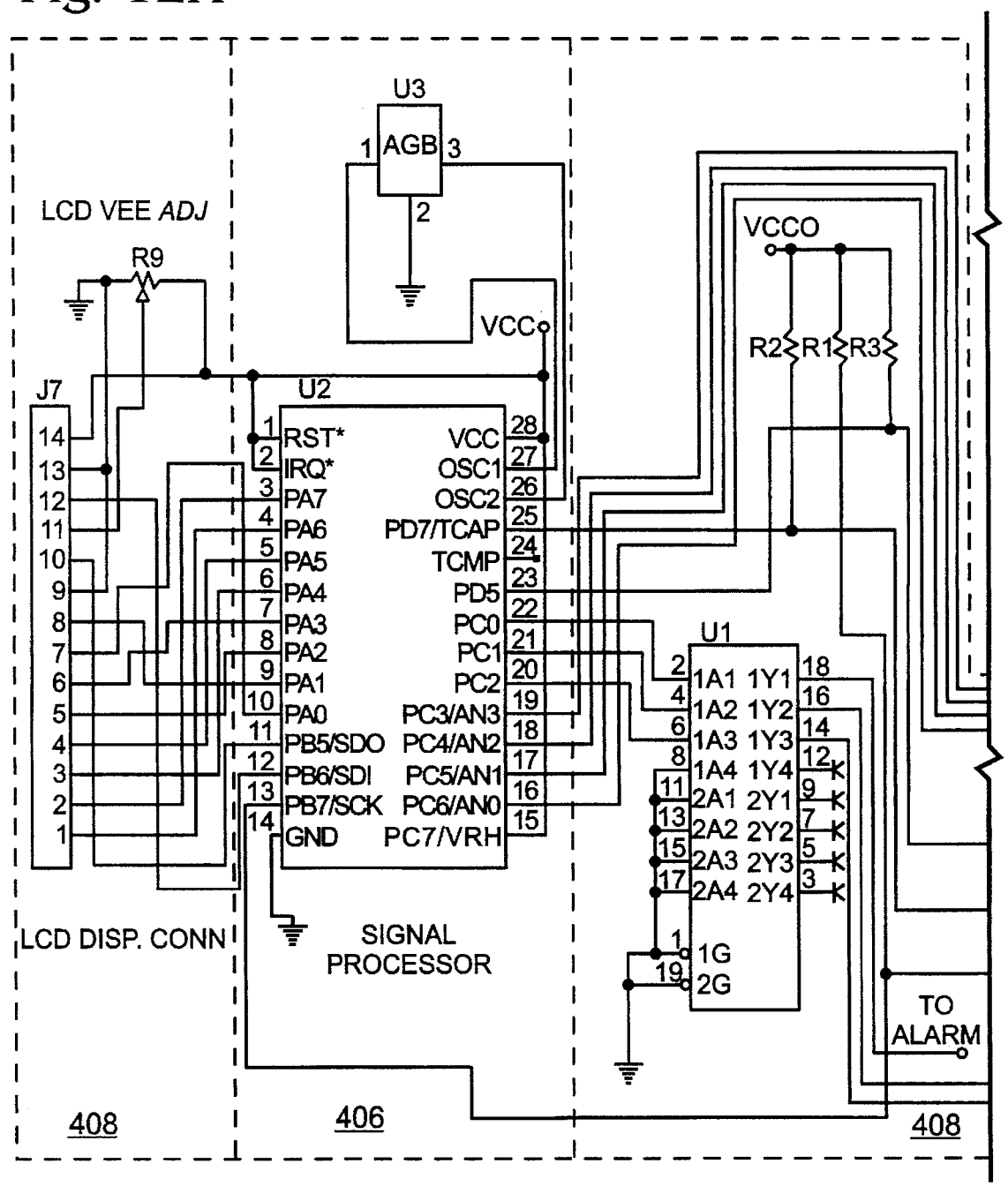
FIG. 12 is a schematic diagram of an exemplary implementation of the apparatus of FIG. 10, omitting the sensing mechanisms and I/O devices.
Figure 12B:
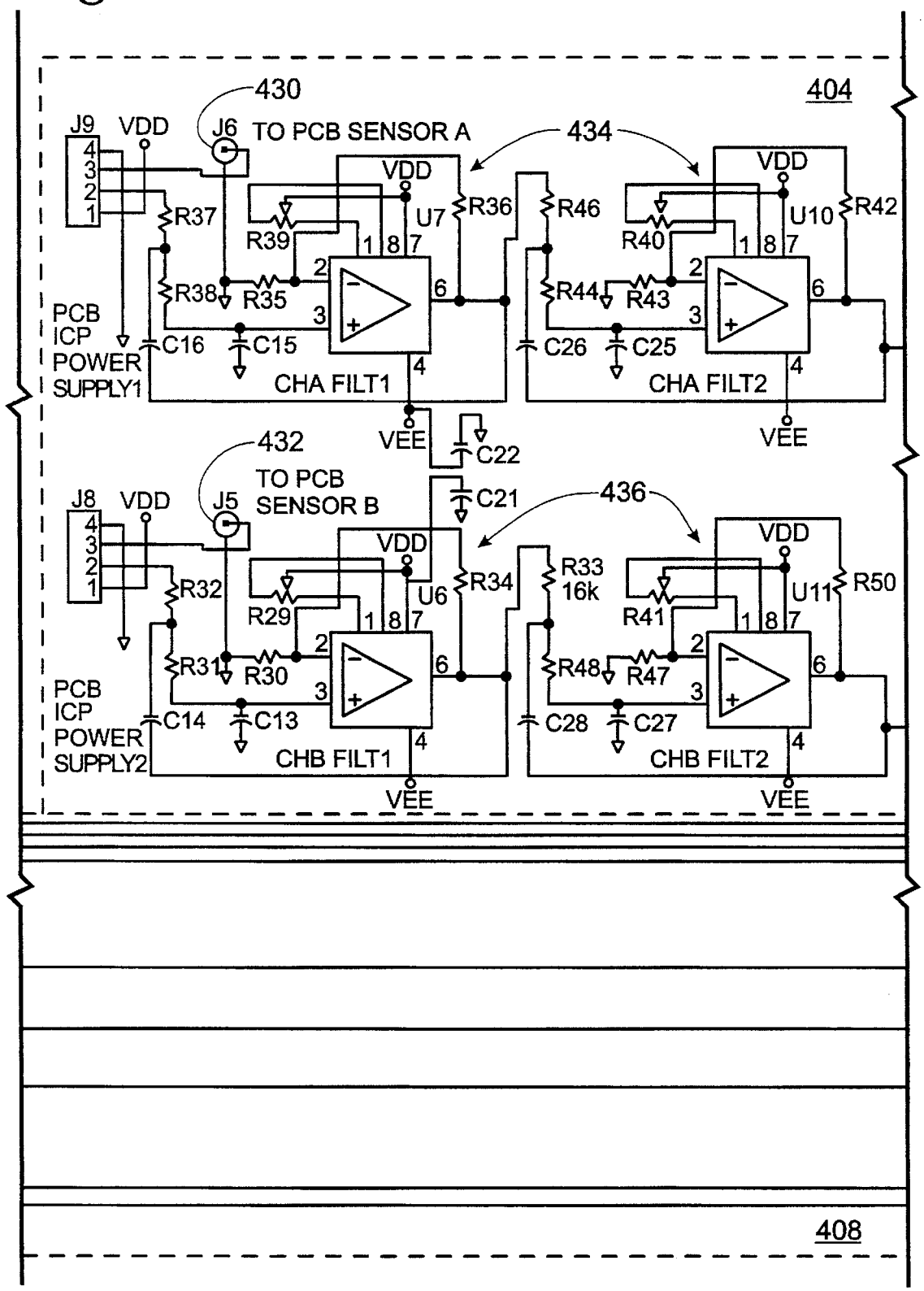
Figure 12C:
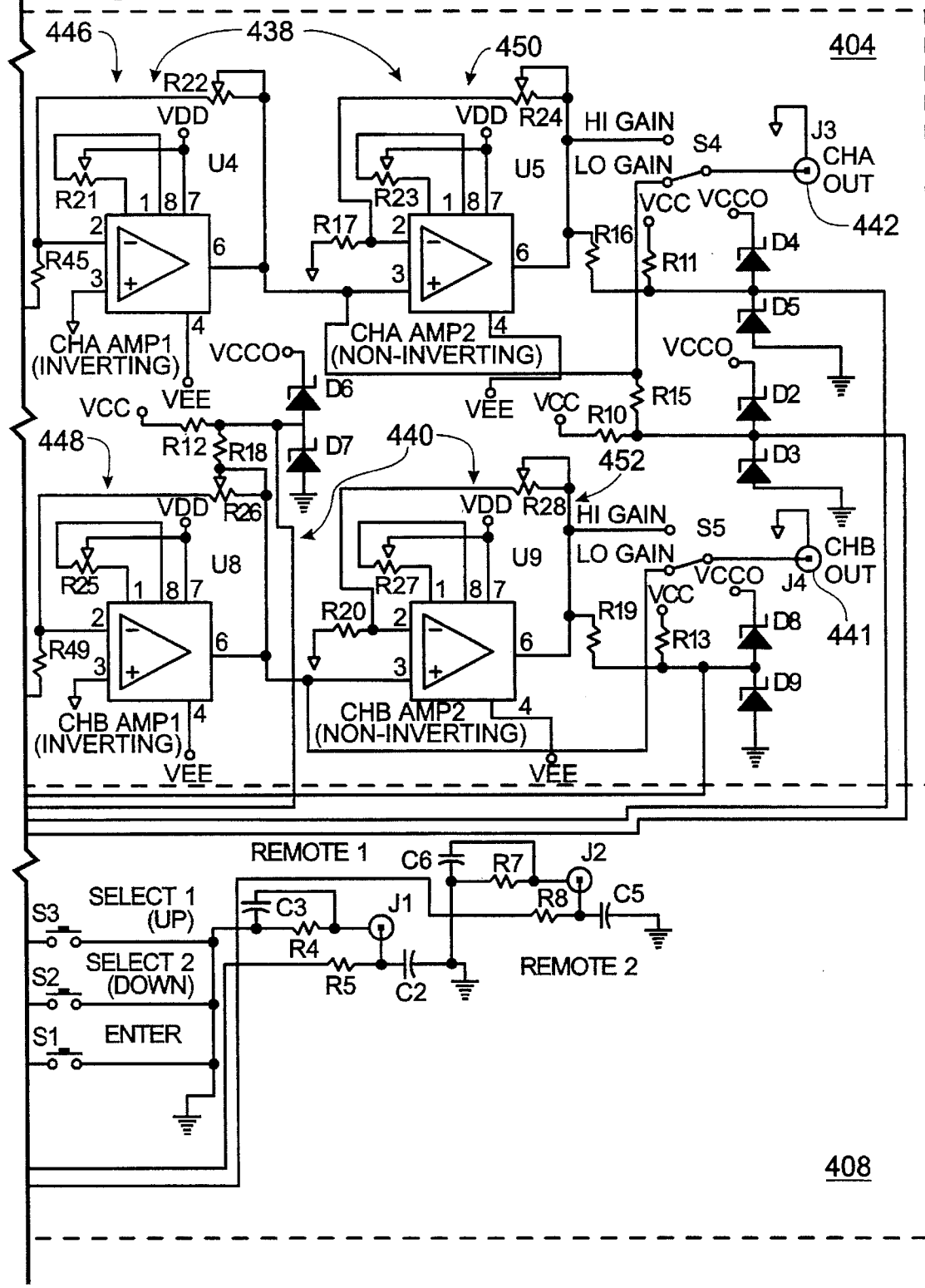

Referring to FIG. 12, an exemplary implementation is depicted of the signal conditioning circuitry 404, the detection mechanism 406 and the I/O drivers 408. The component elements of the implementation are listed in the following table.

| VALUE | COMPONENT (MANUFACTURER) |
|---|---|
| 0.1 uF | C2,C3,C5,C6 |
| 10 uF | C7,C21,C22 |
| 1 uF | C13,C14,C15,C16,C25,C26,C27,C28 |
| 2 k | R1,R2,R3,R10,R11,R12,R13,R15, R16,R18,R19 |
| 10 | R4,R5,R7,R8 |
| 50 k | R9,R21,R22,R23,R24,R25,R26,R27,R28, R29,R39,R40,R41 |
| 2.5 k | R17,R20,R45,R49 |
| 5 k | R30,R35,R43,R47 |
| 16 k | R31,R32,R33,R37,R38,R44,R46,R48 |
| 10 k | R34,R36,R42,R50 |
| SCHOTTKY DIODE | D2,D3,D4,D5,D6,D7,D8,D9 |
| BNC Conn | J1,J2,J3,J4,J5,J6 |
| LCD Display | J7 |
| 4 ma constant current source | J9,J8 (Model 485B DC Powered Signal Conditioner, PCB Piezotronics) |
| PBNO | S1,S2,S3 |
| SPDT | S4,S5 |
| 74HC244 | U1 |
| MC68HC705P9 | U2 (Motorola) |
| RESONATOR | U3 |
| TLE2027AC | U4,U5,U6,U7,U8,U9,U10,U11 (Texas Instruments) |

As shown, the signal conditioning circuitry 404 includes (i) connectors 430 and 432 for receiving leads 426 and 428, respectively, (ii) filter stages 434 and 436 coupled to the connectors 430 and 432, respectively, and (iii) amplifier stages 438 and 440 coupled respectively to the filter stages 434 and 436. Connector 430, filter stage 434 and amplifier stage 438 are associated with, and condition, the electrical signal A generated by the first sensing mechanism 400. Connector 432, filter stage 436 and amplifier stage 440 are associated with, and condition, the electrical signal B generated by the second sensing mechanism 402.

The amplifier stages 438 and 440, as shown, preferably include respective inverting amplifiers 446 and 448, cascaded with corresponding non-inverting amplifiers 450 and 452. Each of the amplifiers 446, 448, 450 and 452 is coupled to the detection mechanism 406. In addition, each pair of amplifiers 446 and 450, and 448 and 452, is coupled to respective output connectors 442 and 444. The output connectors 442 and 444 provide for driving instrumentation, such as strip charts or other devices which may be used for various purposes including, for example, to record the conditioned electrical signals A' and B'.

It is to be recognized that the signal conditioning circuitry 404 may be implemented other than as shown, without departing from the principles of the invention. For example, the circuitry 404 can omit the amplifiers 446 and 450, or 448 and 452, or can omit the output connectors 442 and 444, or both.

The detection mechanism 406, as listed above, comprises a conventional signal processor integrated circuit 454. The I/O drivers 408 similarly comprise conventional circuitry, as listed above. It is to be recognized that the detection mechanism 406 or the I/O drivers 408, or both, can be otherwise implemented, including as described previously herein, without departing from the principles of the invention.

Figure 13:
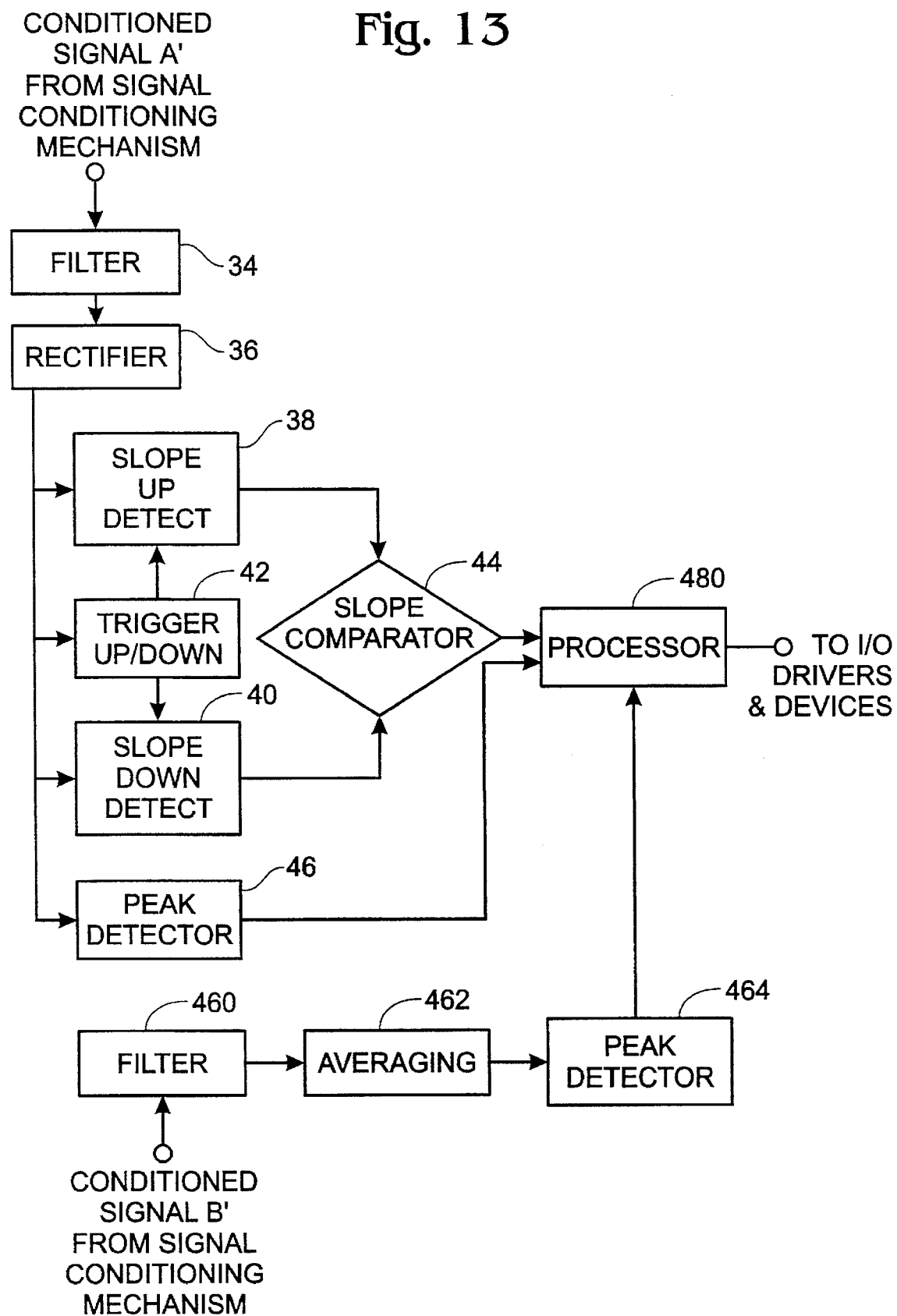
FIG. 13 is a block diagram of a mechanism for detecting precursor seismic activity in sensed skin waves, according to the present invention.

Turning to FIG. 13, the detection mechanism 406 is shown in functional blocks representative of the digital signal processing operations performed on the electrical signals A' and B' received from the signal conditioning circuitry 404. As for the electrical signal A' associated with the first sensing mechanism 400, many of the operations are substantially the same as the operations for acoustic and seismic waves, as depicted in and described above with reference to FIG. 4. Accordingly, those operations are not described further here, including filter 34 rectifier 36, slope up detector 38, slope down detector 40, slope trigger 42, slope comparator 44, and peak detector 46.

As for the electrical signal B' associated with the second sensing mechanism 402, the filter 460 and the peak detector 464 are substantially the same as the previously-described filter 34 and peak detector 46, respectively. Accordingly, these elements are not described further here. Interposed between filter 460 and peak detector 464 is averaging circuit 462. Circuit 462 averages signal B' over a selected time period, e.g. 2.56 seconds, based on samples taken at selected intervals, e.g. 1 millisecond. In this way, averaging circuit 462 minimizes noise in signal B', particularly mechanical noise.

Processor 408 operates substantially similarly to processor 48, described above. For example, processor 408 detects whether precursor seismic activity is indicated from the waveforms that are output respectively from the slope comparator 44 and from the peak detector 464. Such activity is detected for signal A' by the presence of a waveform characterized by (i) pulses having asymmetry, e.g. rising slope greater than falling slope, (ii) at least a predetermined duration, e.g. one or more minutes, and (iii) at least a predetermined peak amplitude, e.g. 100 mV. Such activity is detected for signal B', as filtered and averaged, by the presence of at least a predetermined peak amplitude, e.g. 25 mV.

In the event precursor seismic activity is detected for both signals A' and B', processor 408 associates an intensity value with the anticipated quake at the location of the sensing mechanisms 400 and 402. The intensity value is based on the peak amplitudes output from peak detectors 46 and 464, generally using techniques as previously described. The intensity value preferably is translated into any conventional scale, including, for example, the Modified Mercalli Intensity Scale, subject to prevailing factors such as soil type and liquefaction characteristics.

It will be appreciated that the method and apparatus for detecting precursor seismic activity according to the present invention provides certain significant advantages. In particular, an impending earthquake may be forecast by sensing one or more physical parameters so as to detect precursor seismic activity that may be indicated therein. In addition, an impending earthquake may be forecast at selected times in advance of the quake, each advance time associated with detections of precursor seismic activity in a respective one of the sensed physical parameters. Moreover, the apparatus is easy to use, economical, reliable and portable, allowing people to receive forecasts in their local area. By using the existing AC power grid the present invention makes detection of precursor seismic activity possible in areas of both high and low population density, as virtually anyone connected to the AC power grid may use the grid as an antenna to sense electromagnetic waves associated with precursor seismic activity. These and other important advantages of the invention will be apparent to those skilled in the art to which it pertains.

The foregoing description and disclosure of the method and apparatus has been directed to particular embodiments in accordance with the invention It is evident, however, that many alternatives, modifications, and variations may be made in the apparatus or method, or both, without departing from the principles of the invention.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An apparatus for detecting precursor seismic activity, comprising:

a first skin wave sensing mechanism for producing a first electrical signal representative of sensed skin waves: and a detection circuit, responsive to slopes of said first electrical signal, having a slope up detector, a slope down detector and a slope comparator, said slope comparator producing an indication of the presence of precursor seismic activity when the signal produced by said slope up detector exceeds the signal produced by said slope down detector.

2. The apparatus of claim 1, wherein said detection circuit produces an indication of the presence of precursor seismic activity when said first electrical signal has said slopes for at least a predetermined duration and has at least a predetermined peak amplitude.

3. The apparatus of claim 1, wherein said first skin wave sensing mechanism comprises an accelerometer associated with a base element so as to tune said first sensing mechanism to the desired skin wave.

4. The apparatus of claim 3, wherein said base element has predetermined shape, dimensions and mass, and is formed of predetermined materials.

5. The apparatus of claim 1, further comprising a second skin wave sensing mechanism for producing a second electrical signal representative of sensed skin waves.

6. The apparatus of claim 5, wherein said detection circuit has an averaging circuit for averaging said second electrical signal over a predetermined period and a peak detector for tracking the peak amplitude of said second electrical signal.

7. The apparatus of claim 6, wherein said detection circuit produces an indication of the presence of precursor seismic activity when said first electrical signal has said slopes for a predetermined duration and has at least a predetermined peak amplitude, and said second electrical signal has at least a predetermined peak amplitude.

8. The apparatus of claim 7, wherein at least one of said first and second skin wave sensing mechanisms comprise an accelerometer associated with a base element so as to tune said sensing mechanism to the desired skin wave.

9. The apparatus of claim 8, wherein said base element has predetermined shape, dimensions and mass, and is formed of predetermined material.

10. The apparatus of claim 8, wherein said first skin wave sensing mechanism comprises a piezoelectric accelerometer rated at 20 mV/g, and said associated base element comprises a rod, said rod being approximately 2' in length and 0.25" in cross-sectional diameter and being formed of stainless steel.

11. The apparatus of claim 8, wherein said second skin wave sensing mechanism comprises a piezoelectric accelerometer rated at 10 V/g, and said associated base element comprises a rod, said rod being approximately 3" in length and 3" in cross-sectional diameter and being formed of stainless steel.

12. A method for detecting precursor seismic activity, comprising the steps of:

sensing skin waves of selected frequencies;

producing an electrical signal representative of said sensed skin waves;

detecting the respective slopes of upwardly and downwardly directed transitions of pulses of said electrical signal;

comparing said respective slopes;

producing a peak detector signal representative of the amplitude of said electrical signal; and producing a control signal to indicate the presence of precursor seismic activity when said slope comparing and peak producing steps indicate, respectively, said electrical signal has pulses wherein the slope of said upwardly directed transitions exceeds said slope of said downwardly directed transitions for at least a predetermined duration and said peak detector signal has at least a predetermined value.

13. The method of claim 12, wherein said predetermined duration of said control signal producing step is one or more minutes.

14. The method of claim 12, wherein said predetermined amplitude of said control signal producing step is 100 mV.

15. The method of claim 12, wherein said sensing step comprises using at least two skin wave sensing mechanisms, each mechanism being tuned to sense desired skin waves.

16. The method of claim 12, wherein said sensing step comprises using an accelerometer associated with a base element so as to tune said sensing mechanism to the desired skin wave.

17. The method of claim 16, wherein said sensing step comprises using a base element having predetermined shape, dimensions, and mass and being formed of predetermined material.

18. The method of claim 12, further comprising the step of averaging said electrical signal over a predetermined time period.

19. The method of claim 18, further comprising producing a peak detector signal representative of the amplitude of said electrical signal as averaged.

20. The method of claim 19, wherein said control signal producing step produces a control signal to indicate the presence of precursor seismic activity when said peak detector signal of said averaged electrical signal has at least a predetermined value.

\* \* \* \* \*